US008070605B2

(12) United States Patent
Tien et al.

(10) Patent No.: US 8,070,605 B2
(45) Date of Patent: Dec. 6, 2011

(54) MULTI-AREA PROGRESSIVE GAMING SYSTEM

(75) Inventors: Joseph T. L. Tien, Henderson, NV (US); Vincent Edmiston Heyworth, Las Vegas, NV (US); Kirk K. Johnson, Las Vegas, NV (US); Andrea M. Ruch, Las Vegas, NV (US); Arunachalam Yegappan, Las Vegas, NV (US)

(73) Assignee: Bally Gaming International, Inc., Las Vegas, NV (US)

( * ) Notice: Subject to any disclaimer, the term of this patent is extended or adjusted under 35 U.S.C. 154(b) by 617 days.

(21) Appl. No.: 11/225,703

(22) Filed: Sep. 12, 2005

(65) Prior Publication Data

US 2007/0060365 A1 Mar. 15, 2007

(51) Int. Cl.
*A63F 13/00* (2006.01)

(52) U.S. Cl. ............................... 463/42; 463/40; 463/41

(58) Field of Classification Search .................... 463/27, 463/16–20, 40–42
See application file for complete search history.

(56) References Cited

U.S. PATENT DOCUMENTS 4,527,798 A * 7/1985 Siekierski et al. .............. 463/17
4,692,863 A * 9/1987 Moosz ............................ 463/18
5,249,800 A 10/1993 Hilgendorf et al.
5,257,369 A * 10/1993 Skeen et al. .................. 719/312
5,611,730 A * 3/1997 Weiss .............................. 463/20
5,885,158 A 3/1999 Torango et al.
6,062,981 A * 5/2000 Luciano, Jr. .................... 463/26
6,224,482 B1 * 5/2001 Bennett ........................... 463/20
6,319,125 B1 11/2001 Acres
6,746,330 B2 * 6/2004 Cannon ........................... 463/25
6,908,391 B2 6/2005 Gatto et al.
6,916,247 B2 7/2005 Gatto et al.
6,945,870 B2 9/2005 Gatto et al.
2003/0054881 A1 3/2003 Hedrick et al.
2003/0060283 A1 3/2003 Rowe
2003/0069071 A1 * 4/2003 Britt et al. ....................... 463/42
2003/0100369 A1 5/2003 Gatto et al.
2003/0130039 A1 7/2003 Nelson
2003/0214943 A1 * 11/2003 Engstrom et al. ............. 370/353
2003/0220134 A1 * 11/2003 Walker et al. ................... 463/20
2004/0193726 A1 9/2004 Gatto et al.
2004/0198496 A1 10/2004 Gatto et al.
2004/0229684 A1 11/2004 Blackburn et al.
2004/0254012 A1 12/2004 D'Amico (Continued)

FOREIGN PATENT DOCUMENTS

DE 19842832 A1 3/2000

(Continued)

*Primary Examiner* — David L Lewis
*Assistant Examiner* — Eric M Thomas
(74) *Attorney, Agent, or Firm* — Steptoe & Johnson LLP

(57) ABSTRACT

The system provides a control and management solution for linked gaming machines in a progressive game environment. The system can track multiple meters so that multiple progressive jackpots can be maintained for each game and/or for multiple participating business entities sharing in game revenue. Correspondingly, multiple progressive display meters can be controlled for each game machine. The system is scalable from near area progressive systems to wide area progressive systems. In the event that communication is lost with in a wide area progressive environment, one or more game machines may automatically switch to near area progressive behavior until communication is restored. The system is independent of currency and denomination limitations by employing and converting currency as units instead of particular denominations. Game machine population and participation can be remotely managed, updated, and changed from a central management location.

25 Claims, 11 Drawing Sheets

U.S. PATENT DOCUMENTS

| | | | | |
|---|---|---|---|---|
| 2005/0054445 | A1 | 3/2005 | Gatto et al. | |
| 2005/0172336 | A1 | 8/2005 | Gatto et al. | |
| 2005/0209006 | A1 | 9/2005 | Gatto et al. | |
| 2005/0209007 | A1 | 9/2005 | Gatto et al. | |
| 2005/0221898 | A1 | 10/2005 | Gatto et al. | |
| 2005/0223219 | A1 | 10/2005 | Gatto et al. | |
| 2005/0233811 | A1 | 10/2005 | Gatto et al. | |
| 2005/0239542 | A1 * | 10/2005 | Olsen | 463/27 |
| 2005/0282637 | A1 | 12/2005 | Gatto et al. | |
| 2006/0100010 | A1 | 5/2006 | Gatto et al. | |

FOREIGN PATENT DOCUMENTS

| | | | |
|---|---|---|---|
| EP | 1513118 | A2 | 3/2005 |
| WO | WO 2004004855 | A1 | 1/2004 |

* cited by examiner

FIG. 1
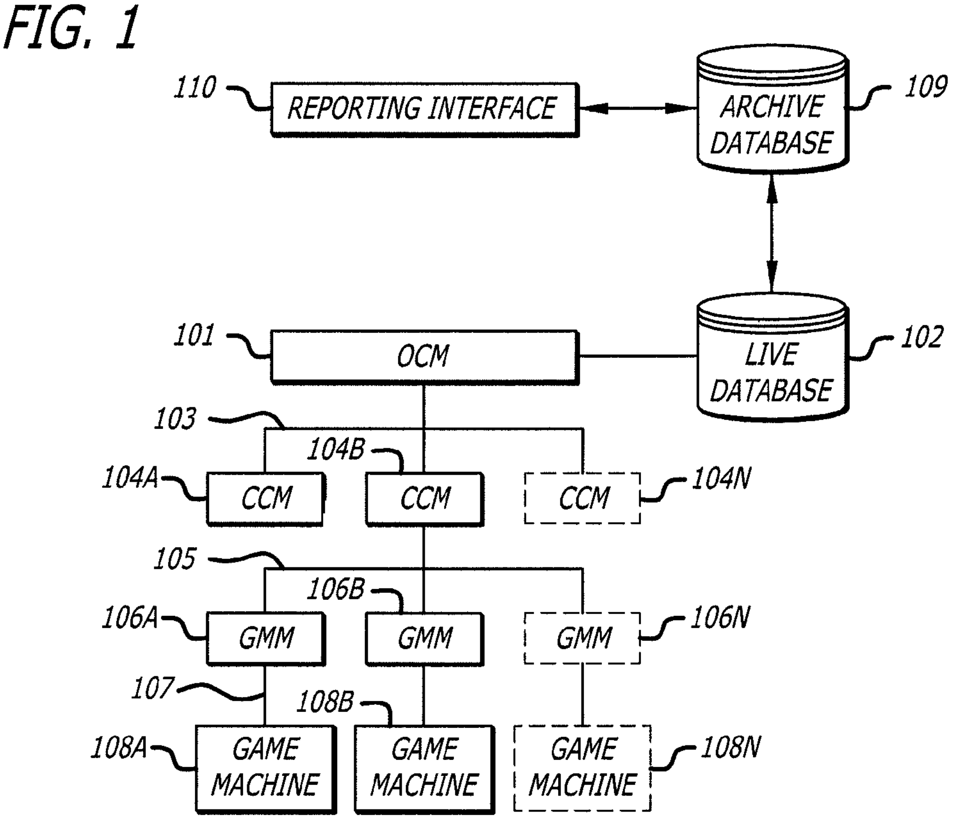
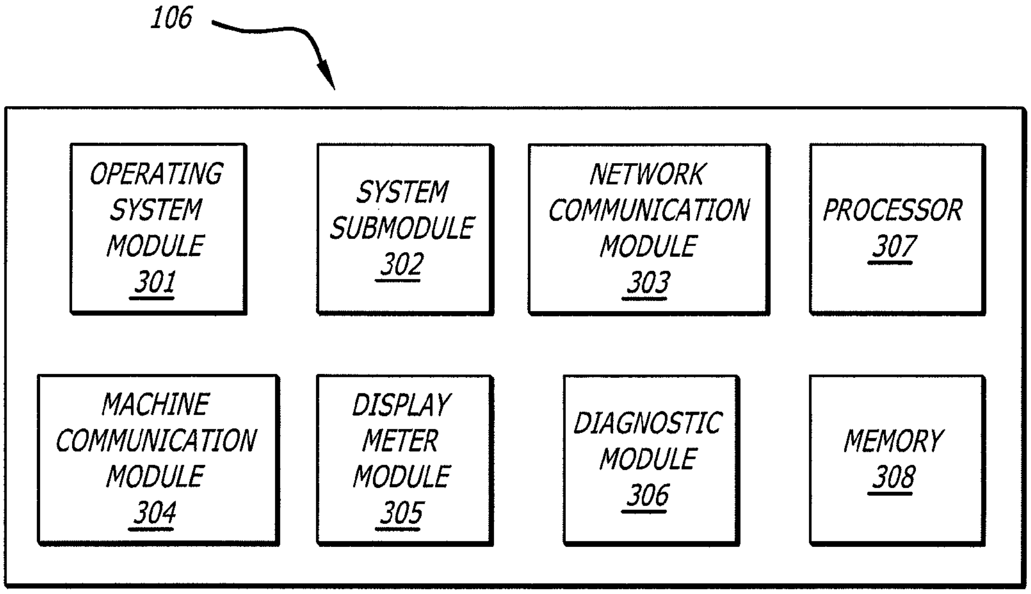
FIG. 3

MULTI-AREA PROGRESSIVE GAMING SYSTEM

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field

This system relates to progressive gaming machines, and more particularly, to multi-area progressive gaming systems.

2. Background Description

Many gaming machines have a specific payout table that associates fixed payout amounts (in coins or credits) with specific combinations. By contrast, a progressive gaming machine is a machine having at least one possible payout that increases over time based on one or more factors and is awarded when a certain combination is achieved on the gaming machine. Such a payout is referred to as a "progressive payout". One example of a factor that can increase the progressive payout is the number of all coins deposited in the gaming machine ("coin in"). The progressive payout may then be some percentage of coin in. Sometimes progressive gaming machines are located in a bank of machines with all machines in the bank playing for the progressive payout. In such cases, the first machine in the bank to achieve the associated winning combination wins the progressive payout. Often, the current value of the progressive jackpot is displayed on a display above the machine. The value of the progressive jackpot is kept in a running counter referred to as a "meter".

In other cases, certain progressive gaming machines may be located anywhere in a gaming establishment and not physically adjacent to each other. In other cases, the progressive gaming machines may be part of a progressive gaming system located in different gaming establishments across a state or other region. Such systems are referred to as "area progressive gaming systems". The progressive payout in such area progressive gaming systems may be tied to the coin in of all of the machines in the system, regardless of where they are physically located in a gaming establishment, state, or region. Such a system requires a method for coordinating and auditing each gaming machine.

SUMMARY

The system provides a multi-area progressive gaming system. The system can track multiple meters so that multiple progressive jackpots can be maintained for each game and/or for multiple participating business entities sharing in game revenue. Correspondingly, multiple progressive display meters can be controlled for each game machine. The system is scalable from near area progressive systems to wide area progressive systems. In the event that communication is lost within a wide area progressive environment, one or more game machines may automatically switch to near area progressive behavior until communication is restored. The system is independent of currency and denomination limitations. Game machine population and participation can be remotely managed, updated, and changed from a central management location.

The system includes a game machine having a memory for storing a plurality of dynamically changing progressive jackpots and processing means for determining when one of the plurality of progressive jackpots is to be awarded. The memory of the game machine includes multiple memory locations for storing each of the dynamically changing progressive jackpots. The game machine may include one or more meters for displaying each of the plurality of dynamically changing progressive jackpots. The value of each of the progressive jackpots may be based on meter related events that occur in the machine. Each progressive jackpot may be allocated a value dependent on the meter related events.

The gaming system may include a network of gaming machines that each can store a plurality of dynamically changing progressive jackpots. The progressive jackpots may have values related to wagers placed at any and/or all of the machines in the network. A central controller may receive all wagering information and perform the calculations necessary to allocate and update the values of the various plurality of dynamically changing progressive jackpots.

In one method of the embodiment, wagering information for all game machines on a network is sent to a central controller for processing. The central controller allocates some percentage of wagered amounts to each of the progressive jackpots and returns the information to the game machines for storage in their local memory and display on display meters as appropriate.

Communication is accomplished by a message data structure that enables the updating and monitoring of multiple progressive meters. The data structure also provides, among other features, dynamic configurability.

These and other objects and advantages of the system will become apparent from the following more detailed description, when taken in conjunction with the accompanying drawings of illustrative embodiments.

BRIEF DESCRIPTION OF THE DRAWINGS

FIG. 1 is a diagram of a network of a progressive gaming system.

FIG. 3 is a block diagram of an embodiment of a GMM.

DETAILED DESCRIPTION OF THE EMBODIMENTS

Figure 2:
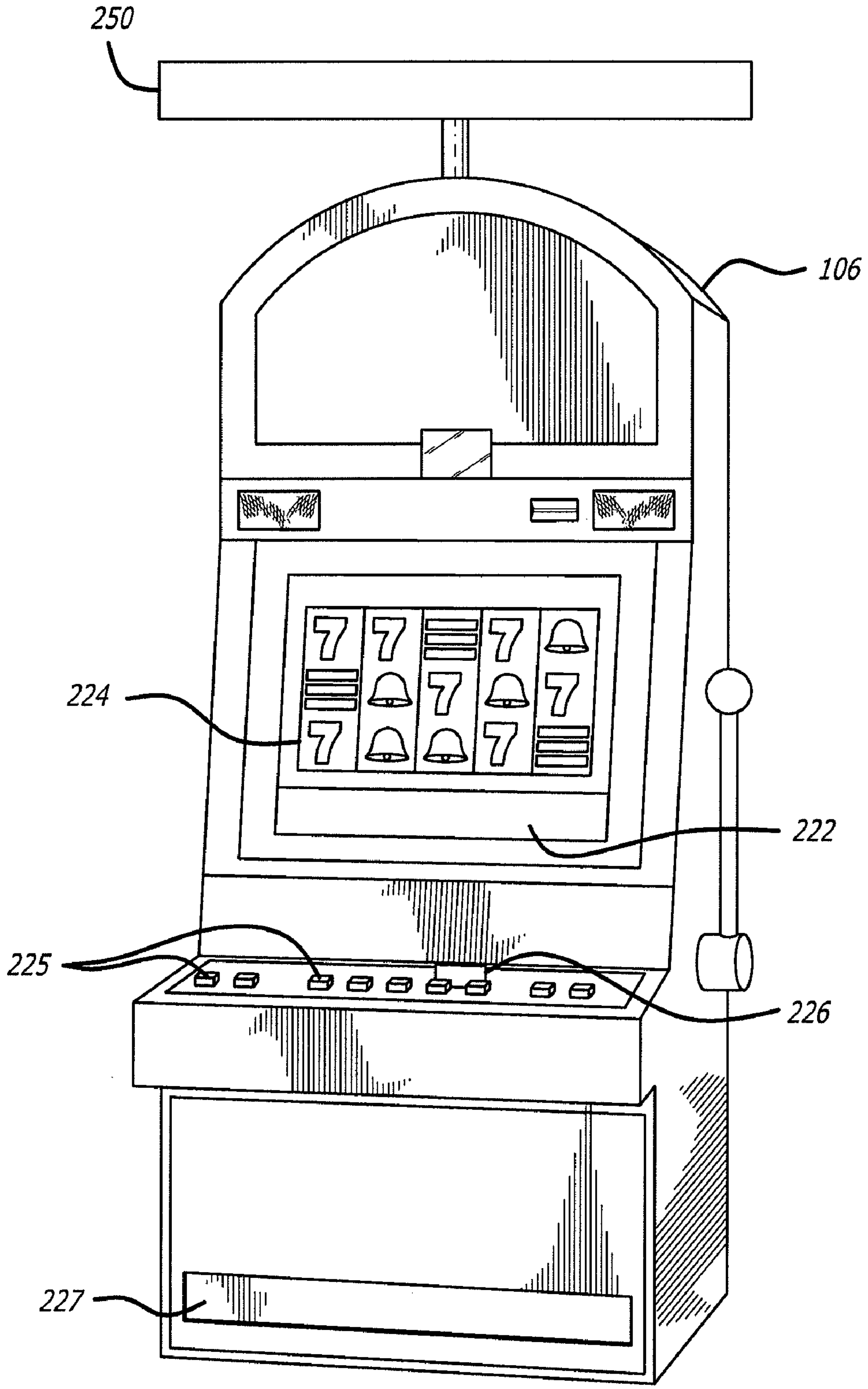
FIG. 2 is a diagram of an example game machine.

The present system provides a multi-area progressive gaming system. The improved system and method provides efficient management and tracking of payouts. The embodiments of the improved system and method are illustrated and described herein by way of example only and not by way of limitation.

In a typical gaming machine, there is a pay table that determines the amount to be paid for certain winning combinations that are achieved by the player. The pay table also has an associated pay out amount based on the amount wagered (coin in). The various winning combinations have different likelihoods of occurring determined by mathematical tables that control the game. Generally, the highest amount paid (jackpot) is for the least frequently occurring winning combination and when the highest amount is wagered.

By contrast, a progressive gaming machine has a pay table with a progressive jackpot that is dynamic and changes over time. A percentage of the coin-in wagers by players of the machine are added to an internal fund that generates the progressive jackpot amount. The longer the machine is played before a progressive jackpot is earned, the higher the progressive jackpot can grow. Such games may entice more players since the progressive jackpot is often many times greater than the jackpot on a fixed pay table machine. A progressive gaming machine may be a single gaming machine or may be part of a number of linked machines. In a linked system, the progressive gaming machines may be located in a single casino as part of a bank of gaming machines. This is often referred to as a near area progressive (NAP). In other applications, the progressive gaming machine may be part of a progressive gaming system with machines in multiple casino locations and even multiple casinos. This is referred to as a wide area progressive (WAP). The winner of the progressive jackpot is the first player who achieves the jackpot combination (with the appropriate wager, e.g. bet max coins) at one of the linked progressive gaming machines, regardless of location.

A linked progressive gaming system requires communication to and from each gaming machine in the progressive gaming network. This communication is important to track coin in for each machine so that the progressive jackpot may be updated continuously so as to accurately represent the desired percentage of coin-in that has been accumulated since the last progressive jackpot payout. This tracking of the progressive jackpot is sometimes referred to as the progressive meter. The progressive jackpot data must be returned to each gaming machine in the network so that a display representing the current state of the progressive jackpot may be updated with current information. In many cases, the progressive jackpot is displayed prominently at a progressive gaming machine as a running total tote board type display on or near the progressive gaming machine. The progressive jackpot can often be seen to increase as it is being observed, due to the fact that at least one of the gaming machines in the progressive gaming network is being played at any one time.

The system described herein provides a communication and control system for an area progressive gaming system. The system provides the capability to control multiple progressive gaming machines at multiple sites from a single central control location. The system also provides the ability to control and process multiple progressive meters per machine and per progressive game network. This permits a number of pay table entries to be dynamically progressive instead of just a single progressive jackpot. For example, typically the progressive jackpot is paid only when the jackpot combination is achieved and the maximum bet is wagered. In machines that permit multiple wager amounts, a player often bets less than the maximum. In some instances, progressive jackpots could be associated with the jackpot combination even when smaller amounts are wagered. In addition, instead of limiting the progressive meter to be tied to a percentage of wagers, the system allows the value of the meter to be tied to other factors as well. For example, the meter value may be tied to coin out (payoff) of one or more gaming machines. In another embodiment, the meter value may be tied to both coin in and coin out. In other instances, one or more meters may be tied to coin in and one or more meters may be tied to coin out.

Consider a progressive gaming machine that permits a player to wage one to three coins. A progressive jackpot could be associated with the jackpot combination when three coins are wagered. A lesser progressive jackpot could be associated with the jackpot combination when two coins are wagered and an even smaller progressive jackpot could be associated with the jackpot combination when only a single coin is wagered. Although the above example describes lower jackpots for lower amounts of coins wagered, it is not limited to such a scheme. The size of the jackpots may be independent of the amount of the wager.

The system also provides security, error logging, scalability, dynamically controlled multiple game support, currency denomination selectability, and level support, and other management functions described below. The control provided by the system allows the scalability of a near area progressive to a wide area progressive. In addition, if there is a problem communicating beyond a casino, the system can automatically switch to operation as a near area progressive until communication is restored.

FIG. 1 illustrates an example of a progressive gaming machine network in one embodiment. An operational control module (OCM) 101 is a central controller that manages the system. OCM 101 is coupled to a live database 102 and via a communications link 103 to one or more casino control modules (CCM) 104A-104N. Each CCM 104 is coupled through a communications link 105 to one or more game machine management modules (GMM) 106A-106N. Each GMM 106 is coupled to a game machine such as game machines 108A-108N via communications link 107.

The communication links between the modules of the network may be wired, wireless, optical, microwave, or any other suitable method for communicating information between the devices. In one embodiment, the game machine 108/GMM 106 link 107 is a serial link, GMM 106/CCM 104 communications link 105 is an Ethernet connection, and CCM 104/OCM 101 communications link 103 uses an MSMQ connection. In one embodiment of the system, the OCM controls up to 255 CCMs. Each CCM can control up to 255 GMMs in one embodiment. In another embodiment, pairs of CCMs are linked to the same subset of GMMs to provide redundancy, security, and more consistent operation.

The live database 102 is coupled to an archive database 109. The archive database is coupled to a reporting interface 110. The archive database 109 and reporting interface 110 are external to the closed system of the remaining components. In one embodiment, the archive database 109 and reporting interface 110 are configured so as to be non-regulated components of the system.

Game Machine

The game machine 108 is of a type that accepts wagers (coin in) and presents combinations of symbols to the player in response to some activation. Certain combinations are presented as winning combinations and return some multiple of the player's wager when achieved. An example of a game machine with a progressive meter is shown in FIG. 2. Gaming machine 108 includes a front panel 222 and further includes a game play display 224, typically being a video monitor or spinning drums (commonly called a slot machine), push buttons 225, and one or more mechanisms 226 for accepting a wager. The gaming machine 108 may also include a coin token dispenser (not shown) which dispenses coin tokens into a tray 227. As shown in FIG. 2, the game machine 108 may be initiated by push buttons 225, or game play may be initiated by some other method, such as a handle or lever (not shown). Shown atop the housing of game machine 108 is a display 250 that displays the current value of the progressive jackpot. The display 250 is in communication with the game machine and ultimately, to a GMM 104 associated with the game machine 108 so that progressive meter information may be accessed and used to update the contents of display 250 to accurately represent the current state and value of the progressive jackpot.

GMM

The GMM 106, as its name suggests, monitors and manages the game machine 108. GMM 106 can connect with game machine 108 via an existing game port, such as RS232 serial port for example, and communicates with the game machine 108 via standard protocols or custom protocols as desired. Each gaming machine 108 may have its own GMM 106 within its cabinet or located external to the cabinet. It is desired that the GMM be secure from tampering wherever it is located and satisfy gaming control board requirements for safety and security. Each GMM 106 in a casino communicates with a CCM 104 over a communication link, such as Ethernet or some other appropriate link, wired, optical, or wireless.

A function of the GGM 108 is to monitor the game machines activities and to control the in-game display meter and any overhead/external meters, particularly those meters associated with the progressive jackpots available via the machine. The GMM 106 has the ability, among other things, to obtain game and game machine data from the game machine 108, to automatically configure and setup games, to participate in the management of multiple progressive meters for a game machine. 108, and to receive, validate, and implement new game machine software. The game may also be capable of lock-out from progressive play.

A block diagram of an embodiment of the GMM 106 is illustrated in FIG. 3. GMM 106 includes a number of functional blocks, including operating system module 301, system sub-module 302, network communications 303, game machine communication module 304, display meter communication module 305, self diagnostic module 306, processing block 307, and memory 308. The operating system module 301 provides processing and an embedded operating system for the GMM 106. The operating system module 301 directs input and output of communication to and from GMM 106.

System sub-module 302 controls communication between operating system module 301 and the rest of the modules of GMM 106. System sub-module 302 provides system initialization service, maintains data for operation of the GMM 106 and display meter information, provides inter-module communication with the other modules 303-306, validates requests and provides system security features.

Network communication module 303 provides communication to the CCM 104. Module 303 can initialize or respond to communication with CCM 104 as necessary or desired and can provide meter data when polled. Module 303 also receives meter display update information and submits the update data to display meter module 305. Module 303 also maintains network metrics and reports diagnostic information to the CCM 104 when requested.

Game machine communication module 304 provides communication service to the game machine 108. It initializes communication to the game machine 108. In one embodiment it polls the game machine 108 at predetermined intervals (e.g. 40 millisecond intervals in one embodiment) and provides data from poll responses to system sub-module 302. The game machine communication module 304 monitors the status of the game machine 108 and reports anomalies as noted. Module 304 can also accept configuration and reconfiguration information for reprogramming the game machine 108.

Display meter communication module 305 provides communication services to any in game and/or external (e.g. overhead) display meters to display progressive jackpot information. It can interface with a plurality of display meters, monitor meter activity and operation for anomalies, and maintain consistent value update information to the display meters.

Self-diagnostic module 306 performs self-diagnostic operations on the GMM 106 itself including, but not limited to, checks on firmware memory integrity, operational error detection, and operating RAM integrity. This module may also handle software/firmware updates to the GMM hardware, display meter hardware and the game machine 108.

The GMM 106 includes processing capability and software to accomplish, among other things, overall system initialization service, maintain game and display data, provide communication services, system security services, and validation of network, game machine, and display meter validation service requests. The GMM 106 uses dynamic addressing via DHCP in one embodiment. This reduces installation errors and can result in a faster install cycle.

GMM/Game Machine Communication

Data Set

In one embodiment, a service frame version query message type is used by the GMM to differentiate protocol versions used by the Game Machine. The data set contemplates a distinction in the messages sent from the Game Machine to the GMM, for messages sent from the GMM to the Game Machine, and for messages sent from the meter to the GMM. For example:

Game Machine to GMM

Coin Out Meter

This meter allows the GMM to verify validity of meter readings.

Number of Coins Played

This is based on the denomination of the game. This is used in the check of the coin in meter sent in the handle pull message type. Previous meter plus the number of coins played should equal current meter.

Games Played Meter

This meter reading is checked for out of range reading from the Game Machine. The GMM will use this meter variant to verify the validity of the coin in meter being sent to the database.

Game Machine Enabled Options

This allows the GMM and database to anticipate possible change of the Game Machine environment, such as denomination change or game change by the player.

Internal Progressive Amount

This allows the Game Machine to communicate internal controlled progressive value to be passed to the in-game display meter. The GMM is notified of this feature from the "Game Machine Enabled Option" message type, if the Game Machine uses the in-game display meter. The GMM shall display the amount provided by the Game Machine and celebrate a progressive hit of the Game Machine internal progressive, as it would with a database-controlled progressive. However the internal controlled progressive information will not be passed onto the database.

Exception Reporting

The exception reporting message type uses two data bytes to report an exception number, from 0x00 to 0xFF. Recognized exception numbers correspond to valid exceptions listed and defined in a message definition section.

Game Changed

This message provides GMM the selected game number on a multi-game platform. An exception indicating game change initiates the retrieval process by the GMM.

GMM to Game Machine

Selected Game Number Update

A game selected exception from the Game Machine initiates this message process. The new game number is used in displaying the correct progressive value for the game.

Multi-Level Progressive Update

This progressive update type will contain values for all configured progressive levels.

Meter to GMM

The 'Sign ID' message type provides the necessary information to identify the meter type and multi-meter information.

Messages

In an embodiment of the system, a number of messages are defined for communication between the Game Machine and the GMM. These messages include:

Game Played
Game Ended
Send Enabled Options
Game's Enabled Options
Retrieve Internal Progressive Value
Game Machine Internal Progressive Value
Exception Report
Progressive Value Update
Active Game Number Update
Game Changed A description of the messages in one embodiment of the system is provided below by way of example, but not by way of limitation:

Game Played 0x50

Message type direction: Game Machine to GMM.

The "Game Played" message is initiated by the Game Machine and sent to the GMM. This message should be sent after the Game Machine has determined the wager has been committed. The GMM acknowledges the message type only.

Byte 0: message type, 0x50
Byte 1-2: Transaction ID, binary format.
Byte 3: Game number, BCD format.
Byte 4: Denomination played, 1 byte, binary format.
Byte 5-8: Total cents wagered, binary format.
Byte 9-14: Game cents in meter, BCD format.
Byte 15-20: Games played meter, BCD format.
Byte 21: Session number, binary format.
Byte 22: Control byte with message sequence number, binary format.
Byte 23-24: 16-bit message CRC value.
Byte 25: End of frame character; 0xFF.

Game Ended 0x51

Message type direction: Game Machine to GMM.

This is a Game Machine initiated message type. The GMM only acknowledges the message type.

Byte 0: message type, 0x51
Byte 1~2—Transaction ID, Binary format.
Byte 3—Game number, BCD format.
Byte 4~7—Game won in cents, Binary format.
Byte 8~13 Game cents out meter, BCD format.
Byte 14~19—Games played meter, BCD format.
Byte 20—Session number, Binary format.
Byte 21—Control byte with message sequence number, Binary format.
Byte 22~23—16-bit message CRC value.
Byte 24—End of frame character, 0xFF.

Send Enabled Options 0x52

Message type direction: GMM to Game Machine.

This is a GMM initiated message type and is a request to the Game Machine for enabled options of a game. The Game Machine responds with message type 0x53. If the Game Machine fails to respond with the proper message type, the GMM uses the default setting for pre-defined options, including options described below by way of example, but not by way of limitation.

Byte 0—message type, 0x52
Byte 1~2—Transaction ID, Binary format.
Byte 3—Game number, BCD format.
Byte 4—Session number, Binary format.
Byte 5—Control byte with message sequence number, Binary format.
Byte 6~7—16-bit message CRC value.
Byte 8—End of frame character, 0xFF.

Game's Enabled Options 0x53

Message type direction: Game Machine to GMM.

This message type is in response to the 'send enabled options' message type and is part of the initialization sequence.

Byte 0—message type, 0x53
Byte 1~2—Transaction ID, Binary format.
Byte 3—Game number, BCD format.
Byte 4~5—Game's base percentage, default=0, BCD format (96.21% is sent as 9621).
Byte 6~7—Game's denomination in cents, default=0, Binary format.
Byte 8~11—Game's max bet in multiple of denomination, default=0, Binary format.
Byte 12—External progressive option, 0=OFF, 1=ON, default=OFF.
Byte 13—Upper nibble, internal progressive option, 0=OFF, 1=ON, default=OFF.
Byte 13—Lower nibble, internal progressive display, 0=OFF, 1=ON, default=OFF.
Byte 14—Upper nibble, hopper, 0=not installed, 1=installed, default=not installed.
Byte 14—Lower nibble, printer, 0=not installed, 1=installed, default=not installed.
Byte 15—AFT feature, 0=OFF, 1=ON, default=OFF.
Byte 16~19—Future use, all 0's, Binary format.
Byte 20—Session number, Binary format.
Byte 21—Control byte with message sequence number, Binary format.
Byte 22~23—16-bit message CRC value.
Byte 24—End of frame character, 0xFF.

Retrieve Internal Progressive Value 0x54

Message type direction: GMM to Game Machine.

This message type is used by the GMM to get the internal progressive values for display. This message type is used if the option to use it is enabled by the Game Machine.

Byte 0—message type, 0x55
Byte 1~2—Transaction ID, Binary format.
Byte 3—Game number, BCD format.
Byte 4—Session number, Binary format.
Byte 5—Control byte with message sequence number, Binary format.
Byte 6~7—16-bit message CRC value.
Byte 8—End of frame character, 0xFF.

Game Machine Internal Progressive Value 0x55

Message type direction: Game Machine to GMM.

This message type is used by the Game Machine to send the internal progressive value to the GMM. In one embodiment, and in the example message below, the message communicates information about four levels of the internal progressive value. However, the system is not limited to four levels of progressive meters, but may have any number of progressive meters without departing from the scope and spirit of the system. The internal progressive value is for display only; the data is not passed on to the CCM or database.

If external progressive option is turn on, the external progressive level values will have priority for display.

Byte 0—message type, 0x55
Byte 1~2—Transaction ID, Binary format.
Byte 3—Game number, BCD format.
Byte 4~8—Internal progressive level 1 value, BCD format.
Byte 9~13—Internal progressive level 2 value, BCD format.
Byte 14~18—Internal progressive level 3 value, BCD format.
Byte 19~23—Internal progressive level 4 value, BCD format.
Byte 24—Session number, Binary format.
Byte 25—Control byte with message sequence number, Binary format.
Byte 26~27—16-bit message CRC value.
Byte 28~End of frame character, 0xFF.

Exception Report 0x56

Message type direction: Game Machine to GMM.

The Game Machine reports exceptions as they occur. Exception has no priority assigned. Valid exception codes are described below by way of example, but not by way of limitation.

Byte 0—message type, 0x56
Byte 1~2—Transaction ID, Binary format.
Byte 3—Exception code, Binary format.
Byte 4—Session number, Binary format.
Byte 5—Control byte with message sequence number, Binary format.
Byte 6~7—16-bit message CRC value.
Byte 8—End of frame character, 0xFF.

Progressive Value Update 0x57

Message type direction: GMM to Game Machine.

The update includes current values for all configured levels, up to 8 levels in the example below, but any number of levels may be supported in the system. The following is given by way of example, but not by way of limitation Byte 0—message type, 0x57
Byte 1~2—Transaction ID, Binary format.
Byte 3—Game number, BCD format.
Byte 4~8—Progressive level 1 value, BCD format.
Byte 9~13—Progressive level 2 value, BCD format.
Byte 14~18—Progressive level 3value, BCD format.
Byte 19~23—Progressive level 4 value, BCD format.
Byte 24~28—Progressive level 5 value, BCD format.
Byte 29~33—Progressive level 6 value, BCD format.
Byte 34~38—Progressive level 7 value, BCD format.
Byte 39~43—Progressive level 8 value, BCD format.
Byte 40—Session number, Binary format.
Byte 45—Control byte with message sequence number, Binary format.
Byte 46~47—16-bit message CRC value.
Byte 48—End of frame character, 0xFF.

Active Game Number Update 0x59

Message type direction: GMM to Game Machine.

The GMM sends this message to get the newly selected game number from the Game Machine. Exception code 0x8C initiates the process. The GMM sends this message during the initialization process to ascertain the active game number. Game number '0' is not a valid active game number. This message type is for use in a multi-game environment.

Byte 0—message type, 0x59
Byte 1~2—Transaction ID, Binary format.
Byte 3—0x00, Reserved for future use.
Byte 4—Session number, Binary format.
Byte 5—Control byte with message sequence number, Binary format.
Byte 6~7—16-bit message CRC value.
Byte 8—End of frame character, 0xFF.

Game Changed 0x5A

Message type direction: Game Machine to GMM.

The Game Machine sends this message when the active game is changed in a multi-game environment. This message is in response to the 'Active Game Number Update' message from the GMM. 'Game Played' message data element, game number, is verified with the current active game number during game play. The value of '0' for current active game number indicates game menu.

Byte 0—message type, 0x5A
Byte 1~2—Transaction ID, Binary format.
Byte 3—Current active game number, BCD format.
Byte 4—Session number, Binary format.
Byte 5—Control byte with message sequence number, Binary format.
Byte 6~7—16-bit message CRC value.
Byte 8—End of frame character, 0xFF.

Sign ID 0x2D

Message type direction: Display Meter to GMM.

This message type is used to identify the display meter to the GMM.

Byte 0—message type, 0x2D
Byte 1—2—Transaction ID, Binary format.
Byte 3—Sign type (see table below for type detail), 1 byte, Binary format.
Byte 4~8—Machine address, 4 bytes, Binary format.
Byte 9~12—Reserved, 4 bytes.
Byte 13~47—Cookie, null terminated 35 byte character string, ASCII format.
Byte 48—Session number, Binary format.
Byte 49—Control byte with message sequence number, Binary format.
Byte 50~51—16-bit message CRC value.
Byte 52—End of frame character, 0xFF.

Display Meter Type Definitions

| Sign Type Value | Type Definition |
|---|---|
| 0x01 | In game display meter |
| 0x02~0x0F | Reserved |
| 0x10 | Overhead display meter |
| 0x11 | Multi-link, multi-level capable display meter |
| 0x12~0x1F | Reserved |

Sign Configuration 0x59

Message type direction: GMM to Display Meter

This message type is used by the GMM to configure the display meter functionality. This message type is sent by the GMM to change the meter's behavior; the content of the display should not change. This message type may be used at any time in response to commands from the CCM.

Byte 0—message type, 0x59
Byte 1~2—Transaction ID, Binary format.
Byte 3—Meter color and effect, 1 byte, Binary format.
Byte 4—Meter font, 1 byte, Binary format.

Byte 5—Meter odometer format, 1 byte, Binary format.

Byte 6—Meter odometer rate, 1 byte, Binary format.

Byte 7—Meter currency symbol, 1 byte, Binary format.

Byte 8—Session number, Binary format.

Byte 9—Control byte with message sequence number, Binary format.

Byte 10~11—16-bit message CRC value.

Byte 12—End of frame character, 0xFF.

| Meter Colors and Effects | |
|---|---|
| Value | Colors/Effects Value Definition |
| 0x00 | Red |
| 0x01 | Green |
| 0x02 | Yellow |
| 0x03 | Alternate Digit |
| 0x04 | Barber Pole |
| 0x05 | Horizontal Bars |
| 0x06 | Vertical Bars |
| 0x07 | Vertical Wipe |
| 0x08 | Fat Alternate Digit |
| 0x09 | Horizontal Wipe |
| 0x0A~0xFF | Reserved |

| Meter Fonts | |
|---|---|
| Value | Font Value Definition |
| 0x00 | Normal Font (default) |
| 0x01 | Fat Font |
| 0x02~0xFF | Reserved |

| Meter Odometer Formats | |
|---|---|
| Value | Format Value Definition |
| 0x00 | Standard (mm,ttt,hhh.cc) |
| 0x01 | European (mm.ttt.hhh,cc) |
| 0x02~0xFF | Reserved |

| Meter Odometer Update Rate | |
|---|---|
| Value | Update Rate Value Definition |
| 0x00 | Standard |
| 0x01 | Slow |
| 0x02~0xFF | Reserved |

| Meter Currency Symbol | |
|---|---|
| Value | Currency Symbol Value Definition |
| 0x00 | U.S. |
| 0x01 | None |
| 0x02~0xFF | Reserved |

Exception Codes

Exceptions

The GMM recognizes these valid exception codes reported by the Game Machine.

| Exception Code | Description |
|---|---|
| 11 | Slot door was just opened |
| 12 | Slot door was just closed |
| 13 | Drop door was just opened |
| 14 | Drop door was just closed |
| 15 | Card cage was just opened |
| 16 | Card cage was just closed |
| 17 | AC power was just applied to the Game Machine |
| 18 | AC power was just lost from the Game Machine |
| 19 | Cashbox door open |
| 1A | Cashbox door closed |
| 1B | Cashbox removed |
| 1C | Cashbox installed |
| 1D | Belly door was just opened |
| 1E | Belly door was just closed |
| 21 | Coin in tilt |
| 22 | Coin out tilt |
| 23 | Hopper empty |
| 24 | Extra coin paid |
| 25 | Diverter malfunction |
| 27 | Cashbox full |
| 28 | Bill jam |
| 29 | Bill acceptor hardware failure |
| 2A | Reverse bill detected |
| 2B | Bill rejected |
| 2C | Counterfeit bill detected |
| 2D | Reverse coin in detected |
| 31 | CMOS RAM error (data recovered from EEPROM) |
| 32 | CMOS RAM error (no data recovered from EEPROM) |
| 33 | CMOS RAM error (bad device) |
| 34 | EEPROM error (data error) |
| 35 | EEPROM error (bad device) |
| 36 | EPROM error, different checksum, version changed |
| 37 | EPROM error, bad checksum compare |
| 3A | Memory error reset (operator used self test switch) |
| 3B | Low backup battery |
| 3C | Operator changed configuration options, including denomination, Game Machine address or any gaming option specific to the Game Machine |
| 3D | A cash out ticket has been printed |
| 40 | Reel tilt, reel unspecified |
| 41 | Reel 1 tilt |
| 42 | Reel 2 tilt |
| 43 | Reel 3 tilt |
| 44 | Reel 4 tilt |
| 45 | Reel 5 tilt |
| 46 | Reel mechanism disconnected |
| 47 | $1.00 bill accepted |
| 48 | $5.00 bill accepted |
| 49 | $10.00 bill accepted |
| 4A | $20.00 bill accepted |
| 4B | $50.00 bill accepted |
| 4C | $100.00 bill accepted |
| 4D | $2.00 bill accepted |
| 51 | Handpay is pending (Progressive, non-progressive or cancelled credits) |
| 52 | Handpay reset (jackpot reset switch activated) |
| 53 | No progressive information has been received for 15 seconds |
| 54 | Progressive win (cashout device/credit paid) |
| 55 | Player has cancelled the handpay request |
| 57 | System validation request |
| 60 | Printer communication error |
| 61 | Printer paper out error |
| 66 | Cashout button pressed |
| 67 | Ticket has been inserted |
| 68 | Ticket transfer complete |
| 6F | Game locked |
| 71 | Change lamp on |
| 72 | Change lamp off |
| 73 | Game reset during pay out |
| 74 | Printer paper low |

-continued

| Exception Code | Description |
|---|---|
| 75 | Printer power off |
| 76 | Printer power on |
| 77 | Replace printer ribbon |
| 78 | Printer carriage jammed |
| 7A | Game soft meter reset to zero |
| 7B | Bill validator totals have been reset by an attendant |
| 80 | Hopper full |
| 81 | Hopper level low |
| 82 | Display meter has been entered |
| 83 | Display meter has been exited |
| 84 | Self test has been entered |
| 85 | Self test has been exited |
| 86 | Game is out of service |
| 8A | Game recall has been entered |
| 8C | Game selected |
| 98 | Power off card cage access |
| 99 | Power off slot door access |
| 9A | Power off cashbox door access |
| 9B | Power off drop door access |

CCM

Figure 4:
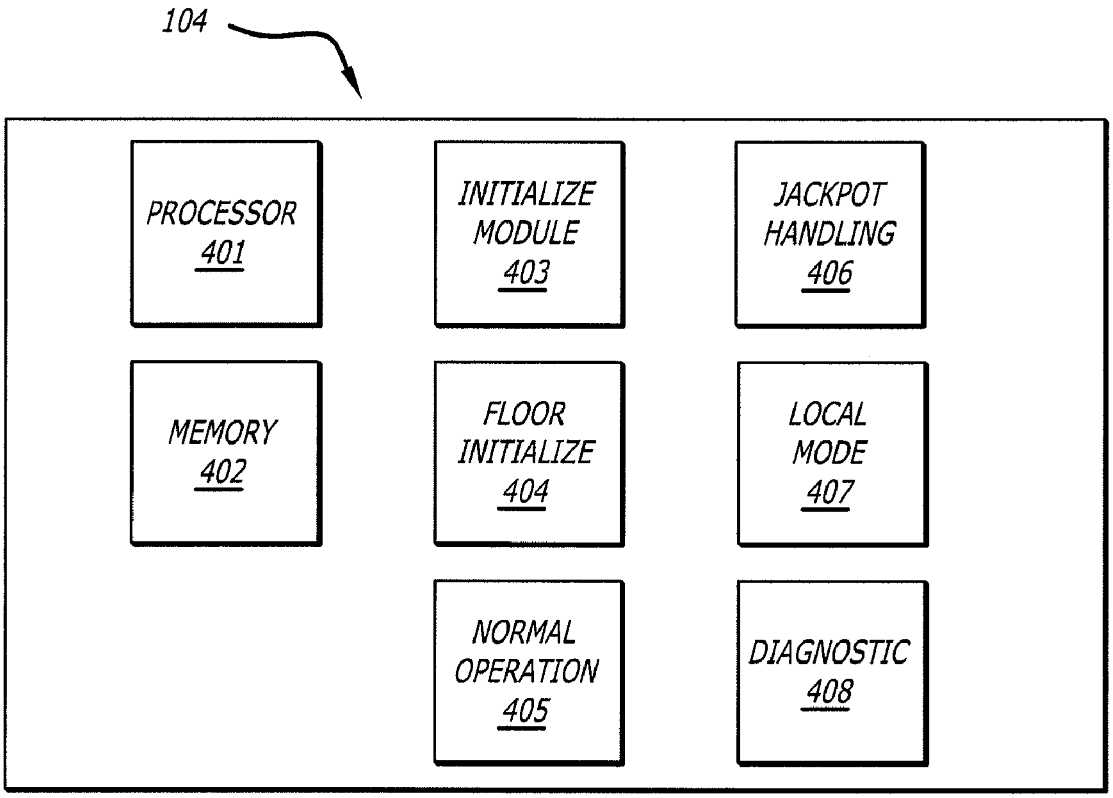
FIG. 4 is a block diagram of an embodiment of a CCM.

The CCM 104 is illustrated in FIG. 4. The CCM 104 provides processing, management, and communications at a location of gaming machines, such as a casino or other gaming establishment. The CCM 104 comprises a processor 401, memory 402, and a number of sub-modules 403-408. The processor 401 may be any general purpose or special purpose processor. In one embodiment, the processor is a Pentium 4 processor at 2.4 gigahertz running Windows XP Professional with SP2. The system includes 1 gigabyte of RAM, 40 gigabyte hard drive, a CD-ROM drive, and Ethernet connection. The memory may include both volatile and non-volatile memory of any suitable type. The CCM 104 handles communications with one or more GMMs 108 in the casino over which the CCM 104 has control. The CCM 104 in turn communicates with an OCM 101.

The initialization module 403 initiates communications with an OCM 101 upon initialization. The CCM receives a configuration file from the OCM 101 and compares it to a locally stored copy. When there is no match, the OCM version controls and the CCM 104 updates its configurations accordingly. The initialization module 403 broadcasts the IP address of the CCM 104 on the casino network so that the GMM(s) can learn the HP address and port number for communication with the CCM 104.

The floor initialization module 404 handles initialization of the casino population of GMMs (and ultimately, the game machines). The configuration file provided by module 403 is read and the collection of machines on the floor is loaded. The GMMs on the casino floor are polled for their respective cabinet numbers, which are then verified by module 404. Module 404 determines if each responding machine is a member of its collection. Module 404 sends cabinet numbers (or other identifying information) to the OCM 101 and receives the machine ID corresponding to the cabinet number from the OCM. Module 404 also requests and receives status messages, game data, game Ids, and jackpot levels. Module 404 requests re-sends for missing or damaged messages, and logs errors that are then forwarded to the OCM.

Normal operation module 405 polls GMMs for messages, receives bets from the GMMS, and receives link update requests from the OCM and forwards parameters to the GMMs. Jackpot handling module 406 is used to manage the jackpot information. Module 406 receives jackpot won messages form the GMMs, stores jackpot information locally and forwards it to the OCM, and receives winner messages from the OCM and forwards them to the appropriate GMM. Jackpot reset messages received from the GMMs are stored locally and forwarded to the OCM.

The casino independent (local) mode module 407 controls game operation when there is a network failure or communications failure with the OCM 101. Module 407, takes over the casino floor and operates the GMMs as a near area progressive instead of a wide area progressive. In this mode the CCM collects bets from attached GMMs, calculates local progressive amounts based on link parameters, handles jackpot events locally and collects game data for eventual transmission to the OCM 101 when communication is re-established.

Diagnostic module 408 commands GMMs to enter diagnostic mode where the CCM can execute diagnostics on the GMM. Afterwards, the CCM 104 can command the GMMs to exit diagnostic mode.

The CCM software is based on a scheme of four task groups. Each Task consists of a sequence of actions, and, before executing these tasks; the software goes through an initialization phase to initialize the appropriate software and hardware.

Background Loop

Fast Task (MSMQ)—Group One

Fast Task (TCP)—Group Two

Front Task (Timers)

Fast Tasks are executed to process the incoming data (all running on different threads in one embodiment). The Front Tasks are executed by the Timer events. The system clock is 200 milliseconds in one embodiment. The Background Loop is executed during idle times. In one embodiment, all Tasks have the same priority. Other than operating system (OS) thread management, no software scheduler or pre-emptive multitasking is required.

Communication and Synchronization

Tasks communicate via shared variables or application-defined mailboxes. Communication is asynchronous. Synchronization and exclusive access to shared resources is done, if necessary, by monitor locks.

Overview of Tasks

During startup, the program enters the initialization phase, initializing the communication threads and the display. After initialization completes, the program enters the Background Loop waiting for one of the Tasks (Front or Fast) to execute, or user input.

Description of Tasks

Background Loop

Background Loop is the system rest state when no other tasks are running. At startup, the program enters the initialization phase, and, once completed, enters the Background Loop and resides here waiting for events to happen.

Fast Task (MSMQ)

Fast Task (MSMQ) executes when there are messages in the MSMQ queue for this CCM. Fast Task (MSMQ) retrieves messages from the queue placing them in the message buffer for processing by the application later. Fast Track (MSMQ) returns after retrieving messages from MSMQ and places them in the message buffer to be processed by the application later.

Fast Task (TCP)

Fast Task (TCP) executes when data arrives at the TCP Port and returns after retrieving complete messages placing them in the message buffer to be processed by the application later.

Front Task (Timers)

Front Task (Timers) run at specific intervals. The application implements, for example, a 200-millisecond timer upon which other software timers are derived. Sub-tasks are executed in their corresponding timer event handlers.

CCM Architecture

The CCM software is based on two-layer architecture consisting of an application layer and a communication layer. The software functions on the Application Layer consist of the general functionalities of the CCM 104, i.e. message processing from the application buffer, updating the local entities, updating display, running local progressive, etc. The Communication Layer consists of the functions used to handle incoming/outgoing data to/from the Ethernet port and MSMQ. The Communication Layer is responsible for retrieving data from the Ethernet port and MSMQ and adding it to the Application Buffer to be processed later. The Communication Layer also retrieves messages from the outgoing Application Buffer sending them to the intended recipient through the appropriate port.

Figure 9:
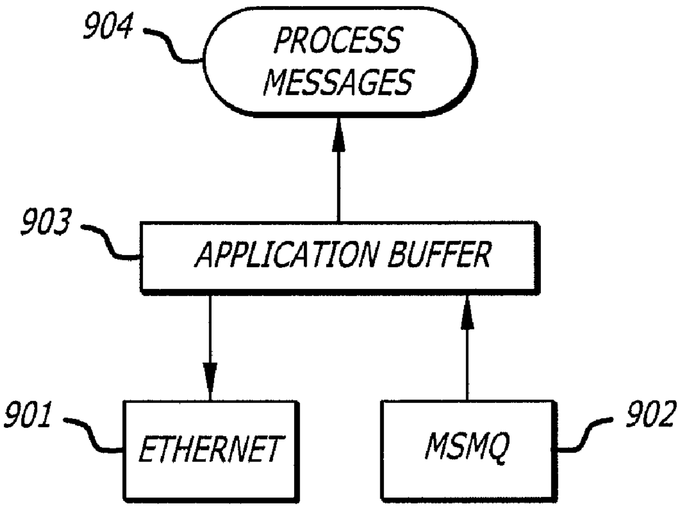
FIG. 9 is a block diagram of a functional embodiment of CCM operation.

Communication between the Communication Layer and the Application Layer for message processing occurs through a shared resource—the Application Buffer. Referring to FIG. 9, the Communication Layer retrieves data from the Ethernet port 901 and MSMQ 902 placing them in the Application Buffer 903. The Application Layer retrieves and processes these messages 904.

CCM Software Flow

Figure 10:
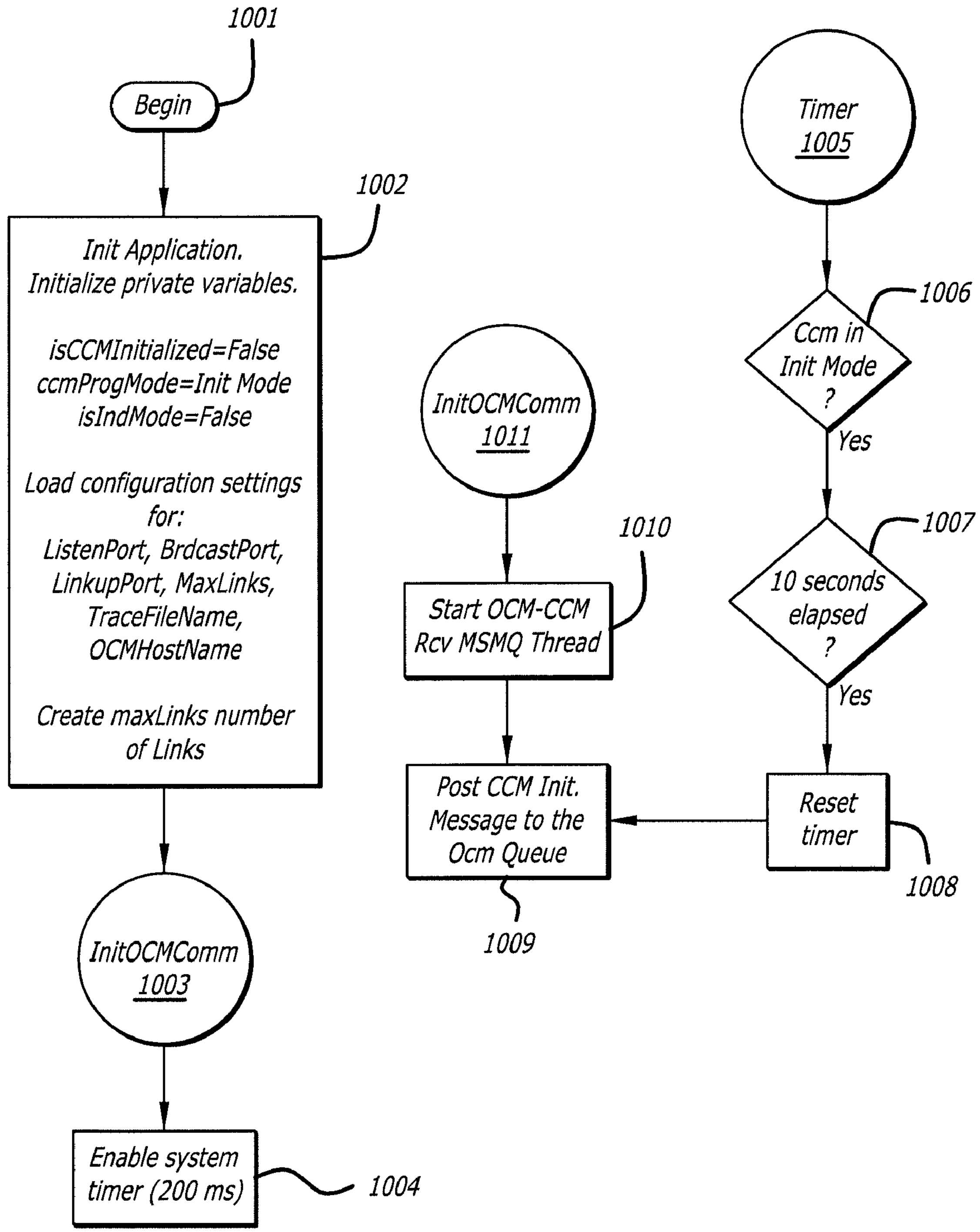
FIG. 10 is a flow diagram of an embodiment of operation of a CCM.

Operation of the CCM is illustrated in the flow diagram of FIG. 10. The CCM is placed in Initialization Mode 1002 on startup 1001. On startup the CCM initializes certain settings to be false until validation, so that the failsafe mode on startup is one of skepticism. As shown at step 1003, is CCMInitialized is set to False. ccmProgMode=InitMOdeislndMode is set to False. Configuration settings for different ports and OCM host name are set and the maxlink number of links are established. Communication with the OCM is initialized at step 1003 and the system timer is enabled at step 1004.

ccmProgMode=globals.CCM_PROG_MODE_INIT. It then sends the CCM initialization message to the OCM at steps 1005 through 1011. In response to the initialization message, the OCM sends the link parameters message containing link information. After all the link parameters messages are received and configured, the CCM goes into CCM_PROG_MODE_NORMAL. The CCM init message is sent every 10 seconds, until all the link parameters are received and the CCM enters normal mode.

GMM/CCM Communication

The GMM 106 communicates with the CCM 104 in one embodiment of the system via an Ethernet LAN. In one embodiment, messages sent from the CCM to the GMM all also pass through the OCM (except in the case where the CCM is operating in independent mode i.e. not in contact with the OCM). If the CCM is not communicating with the OCM, then the CCM originates all of the messages required to communicate with the GMM (with the exception of GMM startup messages). The CCM is not capable of initializing a GMM if it cannot communicate with the central system's data base. The CCM is capable of handling a progressive jackpot when not in communication with the central system, however once the jackpot hits, all machines connected to that CCM will be set offline until communication is re-established with the central site.

| Messages From CCM To GMM | |
|---|---|
| Startup Messages | |
| Machine ID | 0x02 |
| Jackpot Levels | 0x04 |
| Configuration Messages | |
| Meter String.Download | 0x12 |
| Meter Set Configuration (color, font, odo rate) | 0x16 |
| File Download Data Packet | 0x18 |
| Jackpot Responses | |
| Winner Winner | 0x28 |
| Winner Winner Comm Down | 0x2A |
| Diagnostic Messages | |
| ReBoot | 0x30 |
| Configuration Request | 0x32 |
| Diagnostic Output Request | 0x36 |

| Messages From CCM To All GMMs (Broadcast) | |
|---|---|
| Link Update | 0x40 |
| System Date and Time Update | 0x42 |
| Overhead Jackpot Celebration End | 0x44 |
| Progressive Jackpot Won | 0x46 |

| Messages From GMM To CCM | |
|---|---|
| Startup Messages | |
| Cabinet Data | 0x01 |
| Game Data | 0x03 |
| Game Play Messages | |
| Game Start | 0x11 |
| Game End | 0x1F |
| Jackpot Messages | |
| Jackpot Won | 0x21 |
| Jackpot Reset | 0x2F |
| Diagnostic Messages | |
| Configuration Reply | 0x33 |
| Status Update/GMM is Alive | 0x35 |
| Game Exception | 0x3F |

Startup Sequence Diagram
GMM CCM
01 →→→→→gmm sends cabinet number
←←←←←02 ccm replies with machine id
03→→→→→ gmm sends game data for game 1
←←←←←04 ccm sends jackpot levels for game 1
03→→→→→ gmm sends game data for game 2
←←←←←04 ccm sends jackpot levels for game 2
.
.
.
03→→→→→ gmm sends game data for game n
←←←←←04 ccm sends jackpot levels for game n
Jackpot Sequence with OCM Online Diagram
11 →→→→→gmm sends a game start message
1F →→→→→gmm sends a game end message
21 →→→→→gmm sends jackpot won message
←←←←←28 ccm sends winner winner message (gmm starts meter celebration seq)(new jackpot id comes from ccm)

→→→→→2F gmm sends jackpot reset message after game reset key is turned

Jackpot Sequence with OCM Offline Diagram

11 →→→→→gmm sends a game start message

1F →→→→→gmm sends a game end message

21 →→→→→gmm sends jackpot won message

←←←←←2A ccm sends winner winner comm down message (gmm starts meter celebration seq)(all other machines go offline)

2F →→→→→gmm sends jackpot reset message after game reset key is turned

Normal Game Play Sequence Diagram

11 →→→→→gmm sends a game start message

1F→→→→→ gmm sends a game end message

Figure 8:
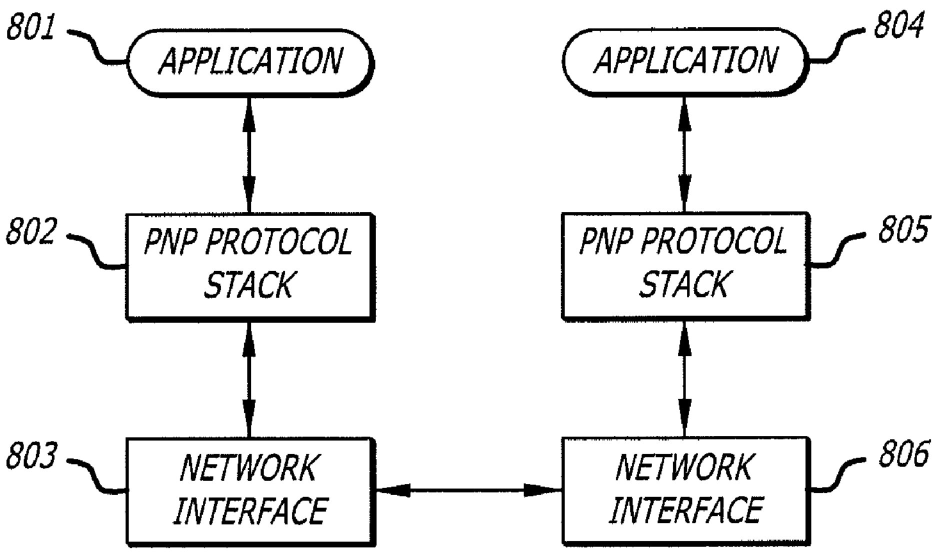
FIG. 8 is a diagram of a network layout of one embodiment of the system.

In one embodiment of the system, message delivery is accomplished using Progressive Network Protocol (PNP) over a dedicated Ethernet link. An example of a possible configuration is illustrated in FIG. 8. The GMM 106 may communicate via a communication application 801 through PNP protocol stack 802 to network interface 803. CCM 104 similarly communicates via application 804 through PNP protocol stack 805 to network interface 806. The network interfaces communicate over the Ethernet link. The Ethernet link, or physical layer, may be a dedicated CAT 5 Ethernet cable between the LAN ports of the GMM and CCM. The data link layer provides application message delivery in one embodiment via sequenced frames, robust error detection, and re-transmission. The link layer also provides data transparency, so information can be ASCII, packed BCD, or simple binary.

The GMM communicates with the CCM using TCP/IP and UDP protocols. The UDP connection is used to receive broadcast messages from the CCM. The TCP/IP connection is used to receive packets for a particular GMM from the CCM and to send packets from the GMM to the CCM. The TCP/IP connection can be viewed as a point-to-point data link since only packets for one GMM are sent on that link. UDP packets are broadcast from the CCM to all GMMs. GMMs do not reply to UDP packets.

Figure 11:
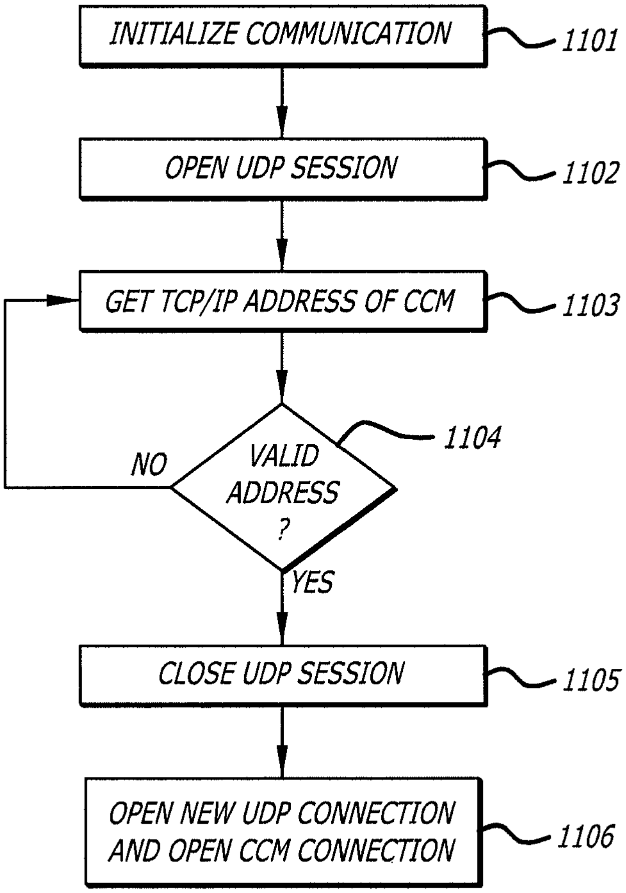
FIG. 11 is a flow diagram illustrating an embodiment of CCM/GMM communication.

FIG. 11 is a flow diagram illustrating an embodiment of communication between the CCM and one or more GMMs. At step 1101, communication between the CCM and the GMMs is initialized. This can include the GMM obtaining an IP address from the network using DHCP. At step 1102 a UDP session is opened on a predetermined port (e.g. port 7777 ). At step 1103 the GMM waits in an infinite loop for a UDP packet containing the TCP/IP address and port number of the CCM. In one embodiment, the format is xxx.xxx.xxx.xxx,nnnn where xxx.xxx.xxx.xxx is the CCM IP address and nnnn is the CCM port number. At decision block 1104 it is determined if the CCM address is valid. If not, the system continues looking at step 1103. If so, then the GMM closes the UDP session on the existing port at step 1105. At step 1106 the GMM opens a new UDP session (e.g. on port 5555) and opens the CCM connection to the valid IP address and port number. The GMM is now able to receive broadcast messages and private messages from the CCM.

Should the UDP or TCP/IP connection between the CCM and GMM fail, the GMM attempts to close the connection(s) (if possible) and then wait for a watchdog reset to restart the GMM. Since TCP/IP is used for communications, no application level retry logic or Ack/Nak logic is necessary. For diagnostic purposes, each message contains a 16 bit sequence number that can be checked by diagnostic software to ensure that no packets are lost or duplicated.

Figure 12:
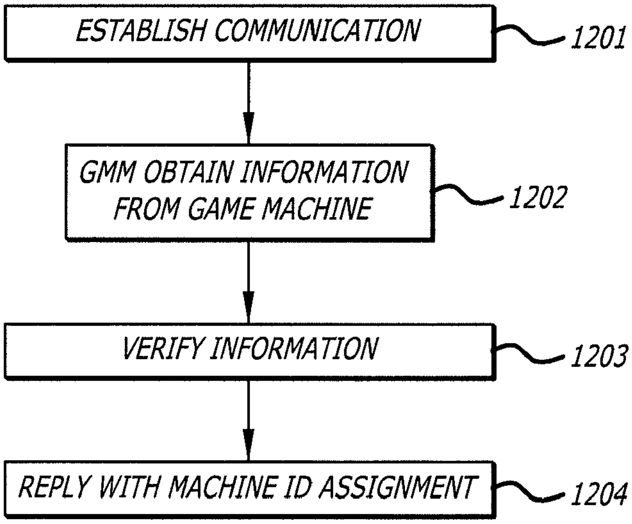
FIG. 12 is a flow diagram illustrating an embodiment of handling new TCP connection requests by a GMM.

FIG. 12 is a flow diagram illustrating an embodiment of establishing communication. Upon start-up at step 1201, the GMM establishes communication with the CCM. Once the communication session is established, the GMM obtains the cabinet number, denomination, and game count from its associated game machine and send it to the CCM at step 1202. The CCM validates the data at step 1203 and replies with a machine id assignment at step 1204 if the cabinet number is found in the data base. If the cabinet number is not found in the data base, no reply will be generated by the CCM and the GMM continues to restart approximately every 30 seconds. The CCM should issue an error message at this point.

Figure 13:
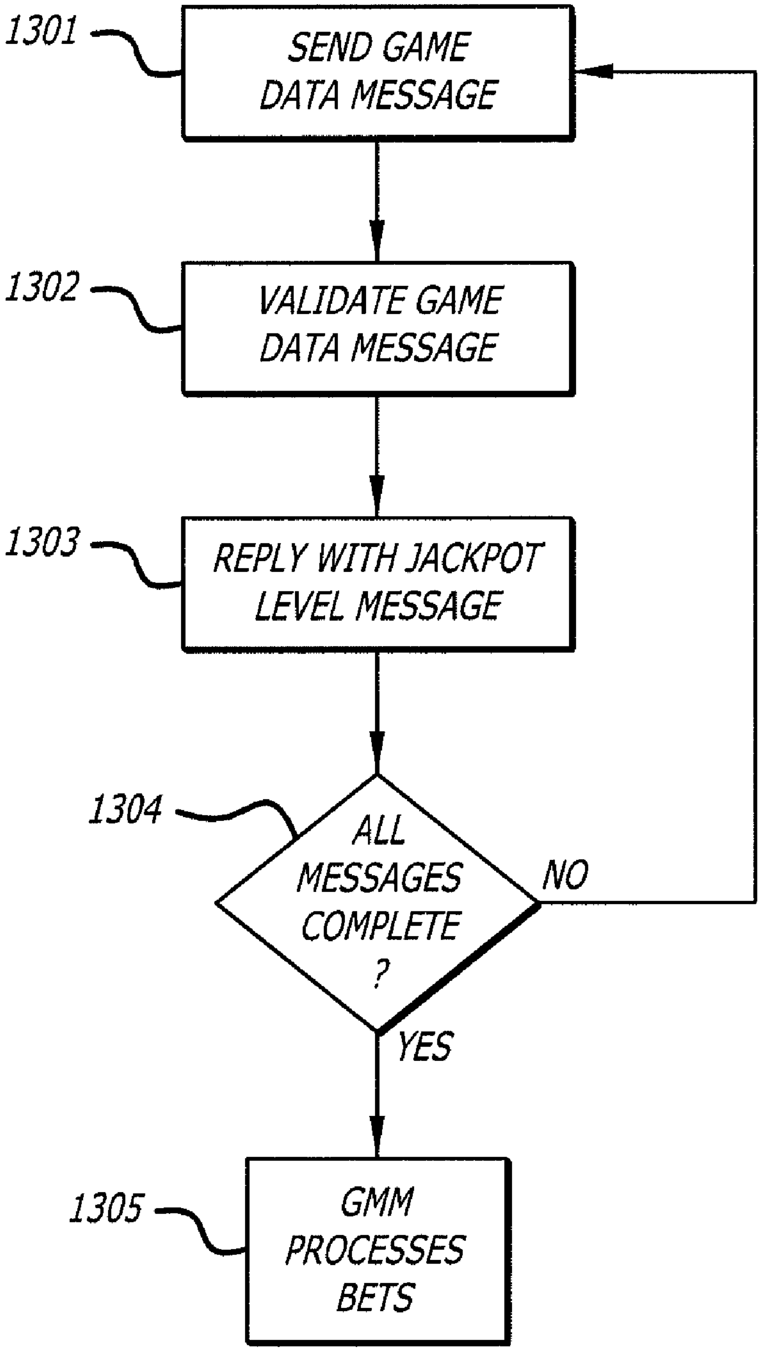
FIG. 13 is a flow diagram illustrating an embodiment of handling an incoming message from a GMM.

FIG. 13 illustrates the operation of the GMM once the machine identifier has been received from the CCM. At step 1301 the GMM continues its startup sequence by sending a game data message to the CCM. The game data message contains the game number, current bet meter, SMI number, jackpot level ID, and progressive flag. At step 1302 the CCM validates the game data and replies with a jackpot level message at step 1303 if the data is correct. The jackpot level message contains the game number; link count, link ID, and jackpot id for that particular game. The GMM sends one game data message for each game (if there are multiple games in the machine) and the CCM replies with a jackpot level message. When all game data messages have been sent and all jackpot level messages have been received by the GMM (step 1304 ), the GMM is able to process bets at step 1305. If the CCM detects errors in the game data, it reports this since the data base.

After the exchange described above is complete, the GMM begins processing link update broadcast messages. The EGM allows play after receiving three link updates from the GMM. This process takes about 15 seconds in one embodiment. The meters attached to the GMM begin to update at this time as well. The CCM sends link update broadcast messages approximately once every 10 seconds.

The application message buffer 903 holds messages intended for this CCM. In one embodiment, every 200 milliseconds, the CCM begins processing messages one-by-one (FIFO). Since the CCM acts just as a communication controller between GMMs and the OCM, it updates the corresponding GMMs properties with the data sent by that GMM and by the OCM for that GMM. By this method, the CCM at all times knows the current state of all GMMs, but does not take any action until the CCM is forced into Independent Mode by a network failure between the CCM and the OCM.

Triggered every 200 milliseconds by a timer event, the CCM retrieves the first message from the application buffer (FIFO), processes it and deletes the message from the application buffer 903.

Messages from the OCM are retrieved from the OCM received in the application buffer. The corresponding message handler handles these messages by updating the CCMs or the GMMs properties as necessary forwarding these messages to the intended GMM.

Figure 14:
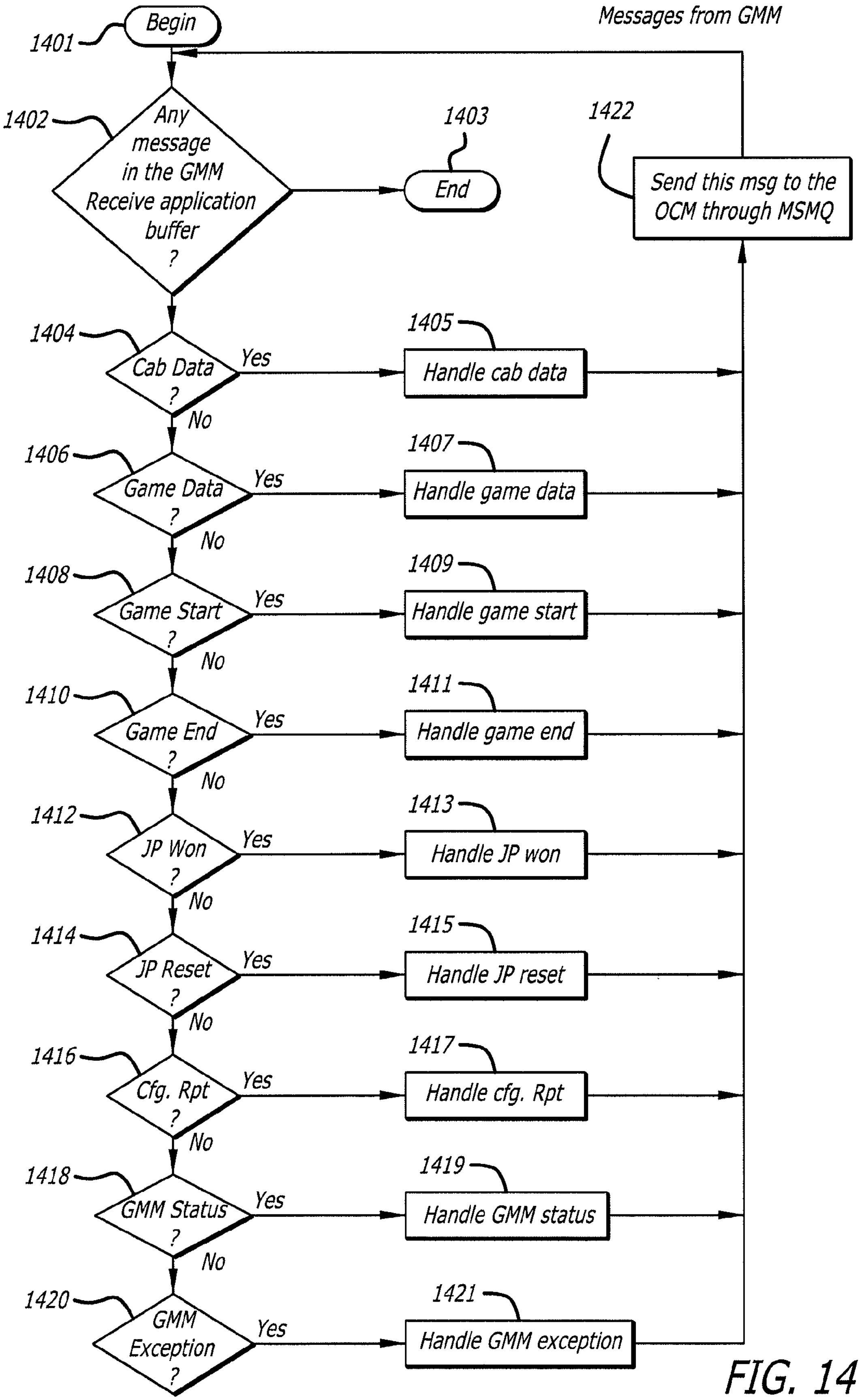
FIG. 14 is a flow diagram illustrating the processing of messages from a GMM to a CCM.

FIG. 14 is a flow diagram illustrating the processing of messages from a GMM to a CCM. The process begins at step 1401. At decision block 1402 the system checks to see if there is any message in the application buffer 903. If not, the system ends at step 1403. If so, the message is checked for a number of information types and instructions. In the embodiment of FIG. 14, the order and number of these are shown for purposes of example only. Other embodiments are contemplated without departing from the scope and spirit of the system. At step 1404 the message is checked for cab data. If yes, the cab data is handled at step 1405 and the message is sent to the OCM at step 1422. If not, the message is checked for game data at step 1406. If yes, the game data is handled at step 1407 and the message is sent to the OCM at steps 1422. If not, the message is checked for game start at step 1408. If yes, the game start is handled at step 1409 and the message is sent to the OCM at steps 1422. If not, the message is checked for game end at step 1410. If yes, the game end is handled at step 1411 and the message is sent to the OCM at steps 1422.

If not, the message is checked for jackpot won at step 1412. If yes, the jackpot won is handled at step 141413 and the message is sent to the OCM at steps 1422. If not, the message is checked for jackpot reset at step 1414. If yes, the jackpot reset is handled at step 1415 and the message is sent to the OCM at steps 1422.

If not, the message is checked for configuration report at step 1416. If yes, the configuration report is handled at step 1417 and the message is sent to the OCM at steps 1422. If not, the message is checked for GMM status at step 1418. If yes, the GMM status is handled at step 1419 and the message is sent to the OCM at steps 1422. If not, the message is checked for GMM exception at step 1420. If yes, the GMM exception is handled at step 1421 and the message is sent to the OCM at steps 1422.

The message handlers noted above are described below by way of example, but not by way of limitation.

HandleCabData (Step 1405 )

Handles the cabinet data message from the GMM

If a GMM with this Cabinet ID does not exist in the collection:

1. Update the GMM's Static and Dynamic properties
2. Create a game count number of games for the GMM adding it to the GMM
3. Add the GMM to the collection of GMM's
4. Forward this message to the OCM If this Cabinet ID already exists in the collection and is associated with a different GMM:

5. Send a configuration error message to the OCM
6. Remove the GMM from the collection (Rogue GMM)

HandleGameData (Step 1407 )

Handles the game data message from the GMM

Find the GMM with this machine ID

Find this game within the GMM

Update the GMM's Dynamic properties

Update the game's Static properties

Forward this message to the OCM

HandleGameStart (Step 1409 )

Handles the game start message from the GMM

Find the GMM with this machine ID

Find this game within the GMM

Update the GMM's Dynamic properties

Update the game's Dynamic properties

Forward this message to the OCM

HandleGameEnd (Step 1411 )

Handles the game end message from the GMM

Find the GMM with this machine ID

Find the game within the GMM

Update the GMM's Dynamic properties

Update the game's Dynamic properties, such as last message received

Forward this message to the OCM

HandleJPWon (Step 1413 )

Handles the jackpot won message from the GMM

Find the GMM with this machine ID

Update the GMM's Dynamic properties

If the CCM is in Independent Mode, mark the GMM's jackpot properties, such as winning game number, winning jackpot time, winning link ID, winning jackpot ID.

Forward this message to the OCM

HandleJPReset (Step 1415 )

Handles the jackpot won message from the GMM

7. Find the GMM with this machine ID
8. Update the GMM's Dynamic properties
9. If the CCM is in Independent Mode, mark the GMM's jackpot reset properties, such as reset game number, reset jackpot time, reset link ID, reset jackpot ID.
10. Forward this message to the OCM HandleGMMConfigRpt (Step 1417 )

Handles the GMM configuration report message from the GMM

Find the GMM with this machine ID

Update the GMM's Dynamic properties

Forward this message to the OCM

HandleGMMStatusUpdate (Step 1419 )

Handles the GMM status update message from the GMM

Find the GMM with this machine ID

Update the GMM's Dynamic properties

Forward this message to the OCM

HandleGMMException (Step 1421 )

Handles the GMM exception message from the GMM

Find the GMM with this machine ID

Update the GMM's Dynamic properties

Forward this message to the OCM

Jackpot Messages

The following messages are discussed here:

Jackpot Won Message (0x21)

Winner Winner Message (0x28)

Winner Winner Comm Down Message (0x2A)

Progressive Jackpot Won Broadcast Message (0x46)

Overhead Meter Celebration Stop (0x44) Broadcast Message

Jackpot Reset Message (0x2F)

The GMM forwards the Jackpot Won message from the game machine to the CCM for validation. The CCM replies with a Winner Winner message if the OCM and Data Base are available. The CCM replies with a Winner Winner Comm Down message if the CCM is operating in stand-alone mode while temporarily out of communication with the central site. Since the Winner Winner message is only sent to the winning GMM, overhead meters need to be informed that a jackpot has been won to start the jackpot celebration sequence. The CCM broadcasts a message to all GMMs instructing them to start a jackpot celebration on any configured overhead meter. This message optionally includes a time duration. The CCM also has the capability to stop any overhead meter from celebration a jackpot by sending an overhead stop celebration message to all GMMs. Also since the Winner Winner message is only sent to the winning GMM, all other GMMs need to know to reset to the next jackpot amount and change the jackpot ID. This is done with a broadcast message (0x46) that affects all but the winning GMM. The GMM sends a Jackpot Reset message to the CCM when the reset key on the game machine is turned.

Configuration Messages

This section describes the GMM configuration messages received from the CCM. These messages are used to change the default parameter settings in the GMM and meter(s).

Meter String Download Message (0x12)

The Meter String Download message is used to send a text message for display on the meter(s). The message is able to be displayed on the overhead meter, in-game meter, or both. The string is able to be displayed periodically, e.g. every 5 minutes. The maximum length of the ASCII text string shall be 132 characters in one embodiment. Up to 32 strings may be active at any one instant in one embodiment. Setting the display update value to zero disables the string display. A jackpot celebration terminates the display of the text string. Text strings are reloaded to the GMMs upon GMM power cycles or restarts. The GMM clears all downloaded strings upon a restart. The string font, color, and consecutive repeat count are also included in the message.

Meter Set Configuration Message (0x16)

The Meter Set Configuration message is used to configure the meter color mode, font, odometer display format, and odometer update rate. This information is reloaded upon GMM power cycles or restarts since the GMM resets meter parameters to the default case upon restarting.

File Download Packet Message (0x18)

The File Download Packet Message is used to transfer files from the CCM to the GMM. A possible use of this feature is to download a new executable image to flash memory such as an M-Systems Disk-On-Chip device. To transfer a file to the GMM, the CCM first sends a packet containing a command to stop normal processing and enter file download mode. The GMM then enters file download mode and remains there until one of the following has occurred:

11. The CCM stops sending data packets for 30 seconds or longer

12. The CCM sends a data packet containing an abort command

13. The CCM sends a reboot command

14. The CCM sends a download complete packet

Within each packet is a 16 bit CRC of the data as well as a packet sequence number for error checking.

Upon successful completion of the file transfer, the GMM closes the temporary download file, renames the file to the specified file name, and sends a download complete message to the CCM in the normal status update message (0x35). If this is an executable file, the next time the GMM is rebooted the file will be executed.

Diagnostic Messages

This section describes the diagnostic messages that are available in the CCM-GMM interface.

Reboot GMM Message (0x30)

The CCM is able to reboot the GMM by sending is a reboot message (0x30).

CCM Configuration Report Request Message (0x32)

GMM Configuration Report Reply Message (0x33)

The CCM is able to request a configuration report from each GMM by sending message 0x32 to the GMM. The GMM formats and replies with message 0x33 containing the GMM firmware version string, CRC of the GMM firmware, number of meters attached to the GMM, a meter configuration string, and details of the current diagnostic request.

GMM Alive Report Message (0x35)

Diagnostic Output Request Message (0x36)

The GMM sends a status message (message type 0x35) to the CCM at least once every 10 seconds containing the status of the game (online or offline) and the status of the meter(s) (online or offline). This message also contains a field for use by diagnostic functions that can be used to log failures and other engineering data. The content of this field is determined by the contents of a Diagnostic Output Request message (0x36) received from the CCM.

CCM Alive Message (0x34)

The CCM sends an "I'm alive!" message (0x34) to each GMM once every 10seconds that is used to inform the GMM that the CCM network connection is active.

Game Exception Message (0x3F)

Reg 14 and other exception messages originating from the game machine shall be sent to the CCM by the GMM.

Broadcast Messages

Messages broadcast from the CCM to all GMMs include the following:

- Link update messages
- Overhead meter jackpot celebration stop command messages
- Progressive jackpot won message
- System time and date messages to synchronize the GMM clocks These messages have been described in the previous sections.

CCM Status Determination

The GMM sends a "ping" message to the CCM approximately every 10 seconds. The CCM responds to the ping allowing the GMM to determine that the CCM is alive. If the CCM fails to respond to the ping, the GMM re-boots and attempts to re-establish communications with the CCM. This approach relieves the application from periodically send an alive message to each GMM.

OCM to CCM Communication

Figure 15:
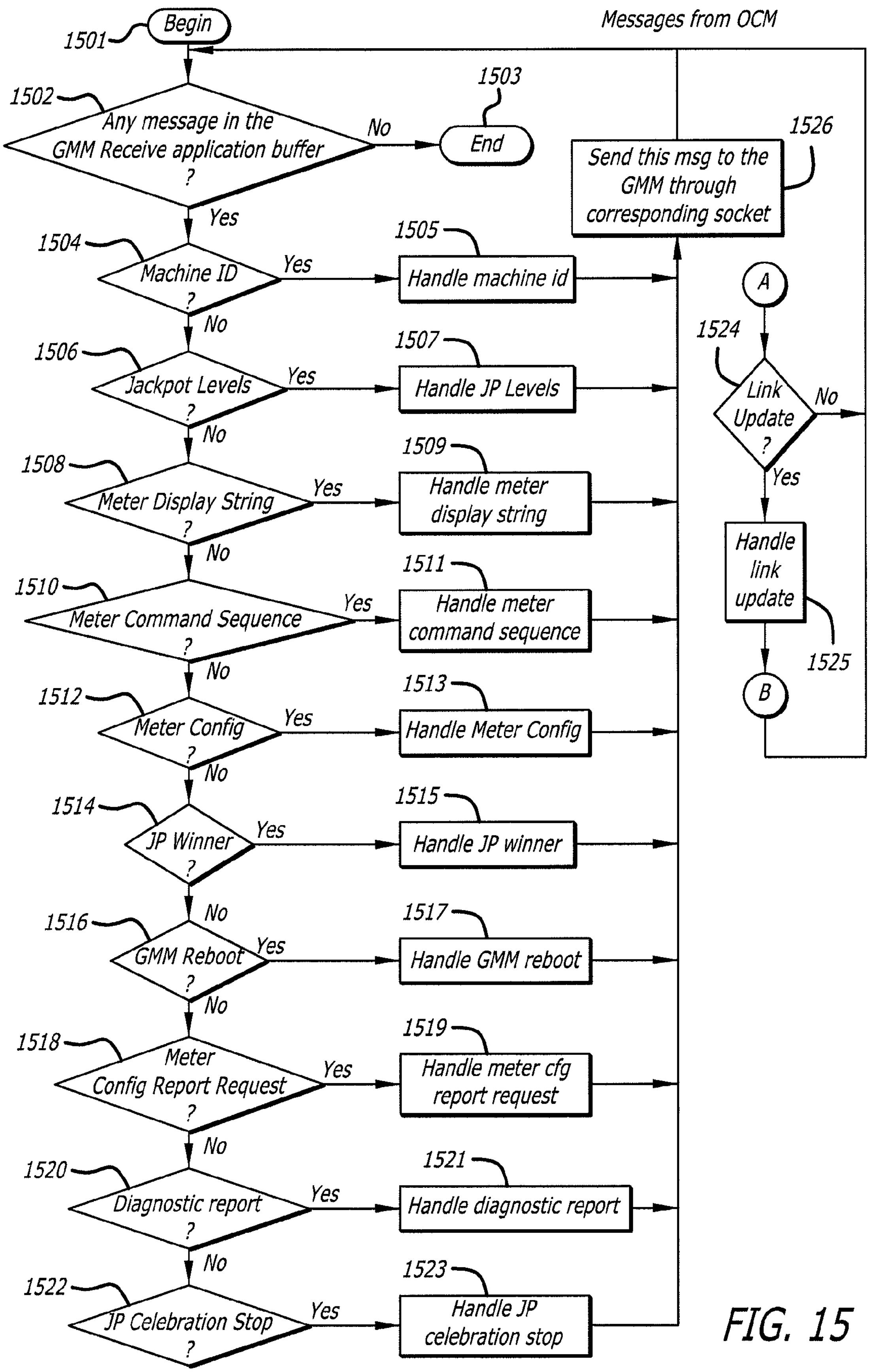
FIG. 15 is a flow diagram illustrating processing messages from the OCM to the CCM in one embodiment.

FIG. 15 is a flow diagram illustrating processing messages from the OCM to the CCM in one embodiment. The order and number of message content and format checks are presented as an example embodiment. Other orders, content, and format may be used without departing from the scope and spirit of the system. At step 1501 the process begins. At decision block 1502 the system checks for messages in the OCM Receive application buffer. If none, the process ends at step 1503. If so, the system checks for Machine ID at step 1504. If yes, the system handles the machine ID at step 1505 and sends the message to the GMM at step 1526. If no, the system checks for jackpot levels at step 1506. If yes, the system handles the jackpot levels at step 1507 and sends the message to the GMM at step 1526.

If no, the system checks for meter display string at step 1508. If yes, the system handles the meter display string at step 1509 and sends the message to the GMM at step 1526. If no, the system checks for meter command sequence at step 1510. If yes, the system handles the meter command sequence at step 1511 and sends the message to the GMM at step 1526. If no, the system checks for meter configuration at step 1512. If yes, the system handles the meter configuration at step 1513 and sends the message to the GMM at step 1526.

If no, the system checks for jackpot winner at step 1514. If yes, the system handles the jackpot winner at step 1515 and sends the message to the GMM at step 1526. If no, the system checks for GMM reboot at step 1516. If yes, the system handles the GMM reboot at step 1517 and sends the message to the GMM at step 1526. If no, the system checks for meter configuration report request at step 1518. If yes, the system handles the meter configuration report request at step 1519 and sends the message to the GMM at step 1526.

If no, the system checks for diagnostic report at step 1520. If yes, the system handles the diagnostic report at step 1521 and sends the message to the GMM at step 1526. If no, the system checks for jackpot celebration stop at step 1522. If yes, the system handles the jackpot celebration stop at step 1523 and sends the message to the GMM at step 1526. If no, the system checks for link update at step 1524. If yes, the system handles the link update at step 1525 and sends the message to the GMM at step 1526.

When a message arrives from the OCM, the Application Layer notes the current time to denote the last message received time from the OCM. This time is used to evaluate whether the CCM should go into Independent Mode or not. If the last message received time is earlier than 60 seconds, then the CCM enters the Independent Mode and begins handling the progressives independently. When the CCM detects the restoration of communication with the OCM, it exits Independent Mode and begins forwarding messages to the OCM.

The message handlers described in FIG. 15 operate as follows:

HandleLinkParameters (Step 1524 )

Handles the LinkParameters message from the OCM

Create a new link and update its link ID, number of levels and each level's progressive rate Insert the link in the link collection at the right index->index=linked After all link parameters are received (specified by number of links in the system), set the variable IsCCMlnitialized to true and set the CCM in ccm_prog_mode_normal.

HandleMachinelD (Step 1505 )

Handles the MachinelD message from the OCM

Find the GMM with this machine ID

Update the GMM's Static properties, i.e. machine ID

Update the GMM's Dynamic properties, i.e. last message type sent

Forward this message to this GMM

All other Handlers (Steps 1507-1523 )

The CCM acts as a simple router for these messages and forwards them to the intended GMM Find the GMM with this machine ID Update the GMM's Static properties i.e. machine ID Update the GMM's Dynamic properties i.e. last message type sent Forward this message to this GMM Message Format The message element dimensions are as follows:

```
BYTE (unsigned char) is 1 byte
UINT (unsigned integer) is 2 bytes
ULONG (unsigned long) is 4 bytes
#define CABINET_ID_SIZE             30    //Num bytes in ASCII cabinet str
#define DENOM_SIZE                   3    //Num bytes in denomination str
#define GAME_CNT_SIZE                2    //Num bytes in BCD game count
#define COIN_METER_LEN               6    //Num BCD bytes for CoinInMeter
#define GAMES_PLAYED_METER_LEN       6    //Num BCD bytes for GamesPlayedMeter
#define GAME_CENTS_OUT_METER_LEN     6    //Num BCD bytes for CentsOutMeter
#define DL_DATA_SIZE               128    //Num bytes of download data
#define DL_END_OF_BLOCK           0×AA    //Download end of block identifier
#define DL_FILENAME_SIZE            32    //Num bytes for download frame
#define DETAILS_LEN                  8    //Num bytes in debug field
#define MAX_JACKPOT_LEVELS           8    //Num jackpot levels supported
#define METER_CFG_STRING_LEN        32    //Num bytes in config string
#define METER_CMD_STRING_LEN       128    //Meter command sequence
#define METER_DISP_STRING_LEN      132    //#bytes in meter display text str
#define PROG_AMOUNT_LEN              5    //Num BCD bytes in prog amount
#define SMI_SIZE                     8    //Num chars in SMI string
#define VERSION_STRING_LEN          32    //Num chars in version string
#define COMMENT_SIZE                80    //File download comment size
```

CCM/GMM Message Formats

Messages sent from the GMM to the CCM

Cabinet Data Message (0x01)

```
typedef struct cabinet_data_msg_struct
{
    BYTE msg_start_char;
    BYTE msg_length;
    UINT machine_id;                     // 0 for this message only
    BYTE msg_type;                       // 0×01
    UINT message_sequence_num;
```

-continued

```
    BYTE cabinet_id[CABINET_ID_SIZE];           // ASCII string
    BYTE denomination [DENOM_SIZE];             // binary value in cents
    BYTE game_count[GAME_CNT_SIZE];             // bcd value
} gmm_cabinet_data_msg;
```

Game Data Message (0x03)

One Game Data Message is sent for each game configured in the EGM.

```
typedef struct game_data_msg_struct
{
    BYTE msg_start_char;
    BYTE msg_length;
    UINT machine_id;                            // received from CCM
    BYTE msg_type;              // 0×03
    UINT message_sequence_num;
    BYTE unused;
    BYTE game_number;                           // binary
    BYTE game_cents_in_meter[COIN_METER_LEN];   // packed BCD
    BYTE smi_number[SMI_SIZE];                  // ASCII string
    BYTE game_progressive_flag;                 // Boolean
    UINT game_base_percentage;                  // packed BCD
    UINT denomination;                          // binary value in cents
    ULONG max_bet;              // binary value in denom multiple
} gmm_game_data_msg;
```

Game Start Message (0x11)

```
typedef struct game_start_msg_struct
{
    BYTE msg_start_char;
    BYTE msg_length;
    UINT machine_id;                            // received from CCM
    BYTE msg_type;              // 0×11
    UINT message_sequence_num;
    BYTE unused;
    BYTE game_number;                           // binary
    BYTE game_cents_in_meter[COIN_METER_LEN];   // packed BCD
} gmm_game_start_msg;
```

Game Over Message (0x1F)

```
typedef struct game_over_msg_struct
{
    BYTE msg_start_char;
    BYTE msg_length;
    UINT machine_id;                    // received from CCM
    BYTE msg_type;              // 0x1F
    UINT message_sequence_num;
    BYTE unused;
    BYTE game_number;                   // binary
    UINT denom_played;                  // binary
    ULONG total_cents_wagered;                      // binary cents
    BYTE game_cents_in_meter[COIN_METER_LEN];                   // packed BCD
    BYTE games_played_meter[GAMES_PLAYED_METER_LEN];            // packed BCD
    ULONG game_won_cents;               // binary
    BYTE game_cents_out_meter[GAME_CENTS_OUT_METER_LEN];        // packed BCD
    } gmm_game_over_msg;
```

Jackpot Won Message (0x21)

```
typedef struct jackpot_won_msg_struct
{
    BYTE msg_start_char;
    BYTE msg_length;
    UINT machine_id;                // received from CCM
    BYTE msg_type;              // 0x21
    UINT message_sequence_num;
    BYTE unused;
    BYTE game_number;               // binary
    ULONG link_id;              // binary
    ULONG jackpot_id;               // binary
```

-continued

```
    ULONG curr_wager;                   // binary-current wagered amount
                                        to
                                        // win the jackpot (pennies)
} gmm_jackpot_won_msg;
```

Jackpot Reset Message (0x2F)

```
typedef struct jackpot_reset_msg_struct
{
    BYTE msg_start_char;
    BYTE msg_length;
    UINT machine_id;                    // received from CCM
    BYTE msg_type;                  // 0x2F
    UINT message_sequence_num;
    BYTE unused;
    BYTE game_number                    // binary
    ULONG link_id;                  // binary
    ULONG jackpot_id;                   // binary
} gmm_jackpot_reset_msg;
```

Configuration Report Message (0x33)

```
typedef struct configuration_msg_struct
{
    BYTE msg_start_char;
    BYTE msg_length;
    UINT machine_id;                        // received from CCM
    BYTE msg_type;                      // 0x33
    UINT message_sequence_num;
    BYTE hour;                          // binary 24 hour format
    BYTE minute;
    BYTE second;
    BYTE month;
    BYTE day;
    UINT year;                          // binary 4 digit format
    BYTE gmm_firmware_version[VERSION_STRING_LEN];              // ASCII string
    UINT gmm_crc;                       // binary
    ULONG gmm_uptime;                       // binary seconds since last gmm startup
    ULONG egm_uptime;                       // binary seconds since last egm startup
    BYTE num_meters;                        // binary
    BYTE meter_config[METER_CFG_STRING_LEN];                    // ASCII string
    BYTE details [DETAILS_LEN];                         // binary
} gmm_configuration_msg;
```

GMM Status Update Message (0x35)

```
typedef struct status_update_msg_struct
{
    BYTE msg_start_char;
    BYTE msg_length;
    UINT machine_id;                // received from CCM
    BYTE msg_type;                  // 0×35
    UINT message_sequence_num;
    BYTE game_comm_status;          // 1 = OK, 0 = Not responding
    BYTE meter_comm_status;         // one bit/meter, 1 = OK, 0 = Not Resp
    BYTE udp_comm._status;          // 1 = OK, 0 = lost comm
    BYTE file_download_status;      // see section 5.9
    BYTE details [DETAILS_LEN];     // binary
} gmm_status_msg;
The details bytes contain the following binary information:
    details[0] = GMM file download error status if a file download is in progress
    details[1] = GMM file download log file status if a file download is in progress
    details[2] = GMM serial port 1 error status ( EGM port )
    details[3] = GMM serial port 2 error status ( meter port )
    details[4] = GMM serial port 3 error status ( unused port )
    details[5] = GMM serial port 4 error status ( unused port )
    details[6] = GMM firmware version number MSB
    details[7] = GMM firmware version number LSB
```

Game Exception Message (0x3F)

```
typedef struct game_exception_msg_struct
{
    BYTE msg_start_char;
    BYTE msg_length;
    UINT machine_id;            // received from CCM
    BYTE msg_type;              // 0×3F
    UINT message_sequence_num;
    UINT exception_field;       // binary exception code (GASS 1.0)
    BYTE exception_code;        // exception code (GASS 2.0)
    BYTE reserved[32];          // for expansion of exception data
} gmm_game_exception_msg;
```

Messages sent from the CCM to the GMM

Machine Identifier Message (0x02)

```
typedef struct machine_id_msg_struct
{
    BYTE msg_start_char;
    BYTE msg_length;
    UINT machine_id;            // binary
    BYTE msg_type;              // 0x02
```

-continued

```
    UINT message_sequence_num;
    BYTE cabinet_id [CABINET_ID_SIZE];      // ASCII string
} ccm_machine_id_msg;
```

Jackpot Levels Message (0x04)

```
typedef struct jackpot_levels_msg_struct
{
    BYTE msg_start_char;
    BYTE msg_length;
    UINT machine_id;            // binary
    BYTE msg_type;              // 0x04
    UINT message_sequence_num;
    BYTE unused1;
    BYTE game_number;           // binary
    BYTE level_count;           // binary number of levels
    ULONG link_id;              // binary
    ULONG                                   // binary, up to
    jackpot_id[MAX_JACKPOT_LEVELS];         level_count vals sent
    ULONG max_wager;            // binary - max wager required to win
            // the progressive (in pennies)
} ccm_jackpot_levels_msg;
```

Meter Display String Message (0x12)

```
typedef struct meter_string_msg_struct
{
    BYTE msg_start_char;
    BYTE msg_length;
    UINT machine_id;                // binary
    BYTE msg_type;                  // 0x12
    UINT message_sequence_num;
    BYTE destination;               // 1 = Overhead, 2 = In-Game, 3 = Both
    BYTE display_string_color;      // color code, see 5.3
    BYTE display_string_font;       // font code, see 5.3
    BYTE display_repeat_count;      // binary, num times to consec repeat
        // the display of a string
    BYTE display_rate;              // binary update cycle time in minutes
    BYTE display_string_number;     // binary, 0 to 31
    BYTE display_string[METER_DISP_STRING_LEN];     // ASCII string, null term
} ccm_meter_string_msg;
```

Meter Configuration Message (0x16)

```
typedef struct meter_config_msg_struct
{
    BYTE msg_start_char;
    BYTE msg_length;
    UINT machine_id;              // binary
    BYTE msg_type;          // 0x16
    UINT message_sequence_num;
    BYTE meter_color;             // for the odometer, binary, see section
                                  5.3.1
    BYTE meter_font;              // for the odometer, binary, see section
                                  5.3.2
    BYTE meter_odometer_format;         // binary, see section 5.3.3
    BYTE meter_odometer_update_rate;    // binary, see section 5.3.4
```

-continued

```
    BYTE meter_currency_symbol;         // binary, see section 5.3.5
} ccm_meter_config_msg;
```

File Download Packet Message (0x18)

```
typedef struct file_download_msg_struct
{
    BYTE msg_start_char;
    BYTE msg_length;
    UINT machine_id;              // binary
    BYTE msg_type;          // 0x18
    UINT message_sequence_num;
    BYTE command;           // binary, see section 5.9
    UINT block_number;            // binary block counter starting at 0
    BYTE block_size;        // binary num bytes in data field below
    BYTE file_name[DL_FILENAME_SIZE];        // ASCII file name
                                             string, null term.
    BYTE data [DL_DATA_SIZE];          // block_size bytes of data
    BYTE end_of_block_char;       // DL_END_OF_BLOCK
} ccm_file_download_msg;
```

The first packet of a file download sequence shall send the current CCM date and time and a comment to the GMM in the data field. The format of this field shall be as follows:

```
typedef struct file_download_date_time
{
```

-continued

```
    BYTE year[4];           // current year, 4 digit ASCII
    BYTE blank1;            // blank
    BYTE month[2];          // current month, 2 digit ASCII
    BYTE blank2;            // blank
    BYTE day[2];            // current day, 2 digit ASCII
    BYTE blank3;            // blank
    BYTE hour[2];           // current hour, 2 digit ASCII, 24 hr fmt
    BYTE blank4;            // blank
    BYTE minute[2];         // current minute, 2 digit ASCII
    BYTE blank5;            // blank
    BYTE second[2];         // current second, 2 digit ASCII
    BYTE blank6;            // blank
    BYTE hunsec[2];         // current hundredths sec, 2 digit ASCII
    BYTE blank7;            // blank
    BYTE comment[80];             // ASCII text comment, null terminated.
              // padded with trailing zeroes
    ULONG checksum;               // file checksum (sum of all bytes)
    ULONG filesize;         // num bytes in download file
    BYTE ipAddr[16];              // IP address of download host string
    BYTE unused;            // unused
} ccm_file_date_time_comment;
```

Winner Winner Message (0x28 and 0x2A)

```
typedef struct winner_winner_msg_struct
{
    BYTE msg_start_char;
    BYTE msg_length;
    UINT machine_id;                  // binary
    BYTE msg_type;          // 0x28 or 0x2A
    UINT message_sequence_num;
    BYTE unused;
    BYTE game_number;                 // binary
    ULONG link_id;          // binary
    ULONG winning_jackpot_id;                 // binary
    BYTE winning_jackpot_amount[PROG_AMOUNT_LEN];        // packed BCD cents
    ULONG next_jackpot_id;            // binary
    BYTE reset_amount[PROG_AMOUNT_LEN];            // packed BCD cents
} ccm_winner_winner_msg;
```

GMM Reboot Message (0x30)

```
typedef struct reboot_msg_struct
{
    BYTE msg_start_char;
    BYTE msg_length;
    UINT machine_id;              // binary
    BYTE msg_type;          // 0x30
    UINT message_sequence_num;
} ccm_reboot_msg;
```

Meter Configuration Report Request Message (0x32)

```
typedef struct report_meter_config_msg_struct
{
    BYTE msg_start_char;
    BYTE msg_length;
    UINT machine_id         // binary;
    BYTE msg_type;          // 0x32
    UINT message_sequence_num;
} ccm_request_meter_config_msg;
```

Diagnostic Report Command Message (0x36)

```
typedef struct diag_control_msg_struct
{
    BYTE msg_start_char;
    BYTE msg_length;
    UINT machine_id;                // binary
    BYTE msg_type;        // 0x36
    UINT message_sequence_num;
    BYTE command;         // binary command code, see section 5.4
} ccm_diag_control_msg;
```

Broadcast Messages from the CCM to all GMMs

Link Update Message (0x40)

```
typedef struct link_update_msg_struct
{
    BYTE msg_start_char;
    BYTE msg_length;
    UINT machine_id;                // binary
    BYTE msg_type;        // 0x40
    UINT message_sequence_num;
    ULONG link_id;        // binary
    BYTE num_levels;                // binary
    LinkUpdate[MAX_JACKPOT_LEVELS];         // see below
    ULONG max_wager;
} ccm_link_update_msg;
typedef struct link_update_value
{
    ULONG jackpot_id;               // binary
    BYTE current_amount[PROG_AMOUNT_LEN];   // packed BCD
                                            in cents
} LinkUpdate;
```

System Date and Time Update Message (0x42)

```
typedef struct system_date_time_msg_struct
{
    BYTE msg_start_char;
    BYTE msg_length;
    UINT machine_id;                // binary
    BYTE msg_type;             // 0x42
    UINT message_sequence_num;
    BYTE hour;                 // binary 24 hour format
    BYTE minute;               // binary
    BYTE second;               // binary
    BYTE month;                // binary
    BYTE day;                  // binary
    UINT year;                 // binary 4 digit format
} ccm_date_time_msg;
```

Overhead Meter Jackpot Celebration Stop Message (0x44)

```
typedef struct overhead_jackpot_celebration_stop_msg_struct
{
    BYTE msg_start_char;
    BYTE msg_length;
    UINT machine_id;                // binary
    BYTE msg_type;             // 0x44
    UINT message_sequence_num;
} ccm_overhead_jp_stop_msg;
```

Progressive Jackpot Won Message (0x46)

```
typedef struct prog_winner_msg_struct
{
    BYTE msg_start_char;
    BYTE msg_length;
    UINT machine_id;                        // binary
    BYTE msg_type;            // 0x46
    UINT message_sequence_num;
    BYTE unused;
    BYTE game_number;                  // binary (unused)
    ULONG link_id;            // binary
    ULONG winning_jackpot_id;                  // binary
    BYTE winning jackpot_amount[PROG_AMOUNT_LEN];   // packed
                                                    BCD in
                                                    cents
    ULONG next_jackpot_id;                // binary
    BYTE reset_amount[PROG_AMOUNT_LEN];             // packed
                                                    BCD in
                                                    cents
} ccm_prog_winner_msg;
```

OCM

Figure 5:
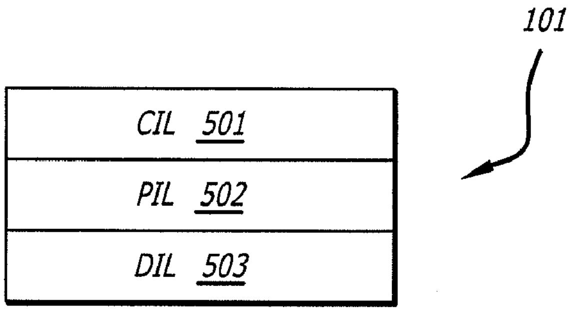
FIG. 5 is a block diagram of an embodiment of an OCM.

The operation control module 101 is the controller of the gaming system and is illustrated in FIG. 5. The OCM 101 in one embodiment has three logical layers; casino interface layer (CL) 501, personnel interface layer (PIL) 502, and database interface layer (DIL) 503. The CIL 501 communicates with the OCM 104 on one side and with the DWL 503 on the other side. The PIL 502 communicates with the user on the front end and the DIL 503 on the back end to display information about system components such as GMM, CCM links, awards, events, and their respective status. This layer also handles configuration, event management, and normal operation. The DIL 503 communicates with the database 208 and serves the CIL 501 and PIL 502.

The CIL 501 is a communication layer. The CIL may use a polling protocol and poll each CCM for messages/responses. The CIL 501 handles inbound messages from the CCMs including, but not limited to, the following, CCM initialization, cabinet data, GMM status, CCM status, game data, bets, jackpot data (amount, won, awarded, reset), and diagnostic information and instantiation. The CIL 501 sends messages to the CCMs including, but not limited to, configuration file location, machine ID, Game ID, jackpot levels, link parameters and updates, CCM status requests, GMM status requests, jackpot winner, message acks, and diagnostic requests.

The DIL 503 receives requests sent to the database from the OCM 101 and PIL 502. Data sent to the database from OCM 101 and PL 502 are also routed through the DWL 503.

The database 102 is a relational database in one embodiment of the system. Each jurisdiction associated with the system has a copy of the database live on the database 102. The database design has the ability to perform the following functions by way of example, but not by way of limitation:

1. Represent linked betting (wagering) systems of all types, including, but not limited to, linked slot machines, lottery systems, etc.
2. Track all bets (wagers) placed by these linked systems down to the machine level.
3. Track the various components making up the games, such as location, pertinent hardware, and installation dates.
4. Track jackpots for each linked system, and the awards paid for each jackpot won, and the various rates associated with jackpots, such as progressive, break, and hidden.

5. Track an infinite number of jackpot levels for each linked system.
6. Track multiple business enterprises housing these gaming systems and their locations, as well as casinos and other betting (wagering) locations owned by these businesses, as well as the locations of the machines within these businesses.
7. Track events related to each game, from routine maintenance procedures to machine faults and system idle time.
8. Track the billing rules for each business enterprise.

Archive database 109 is separate from the live jurisdictional database 102 and data in one embodiment only flows from the live database 102 to the archive database 109. The archive database is accessed by a reporting interface 110 so that near real time reporting of data and performance may be obtained. The archive database 109 stores all data from the progressive gaming system of the system. In one embodiment, the data is saved in a denormalized format. The archive module is password protected for operational security in one embodiment of the system.

Figure 7:
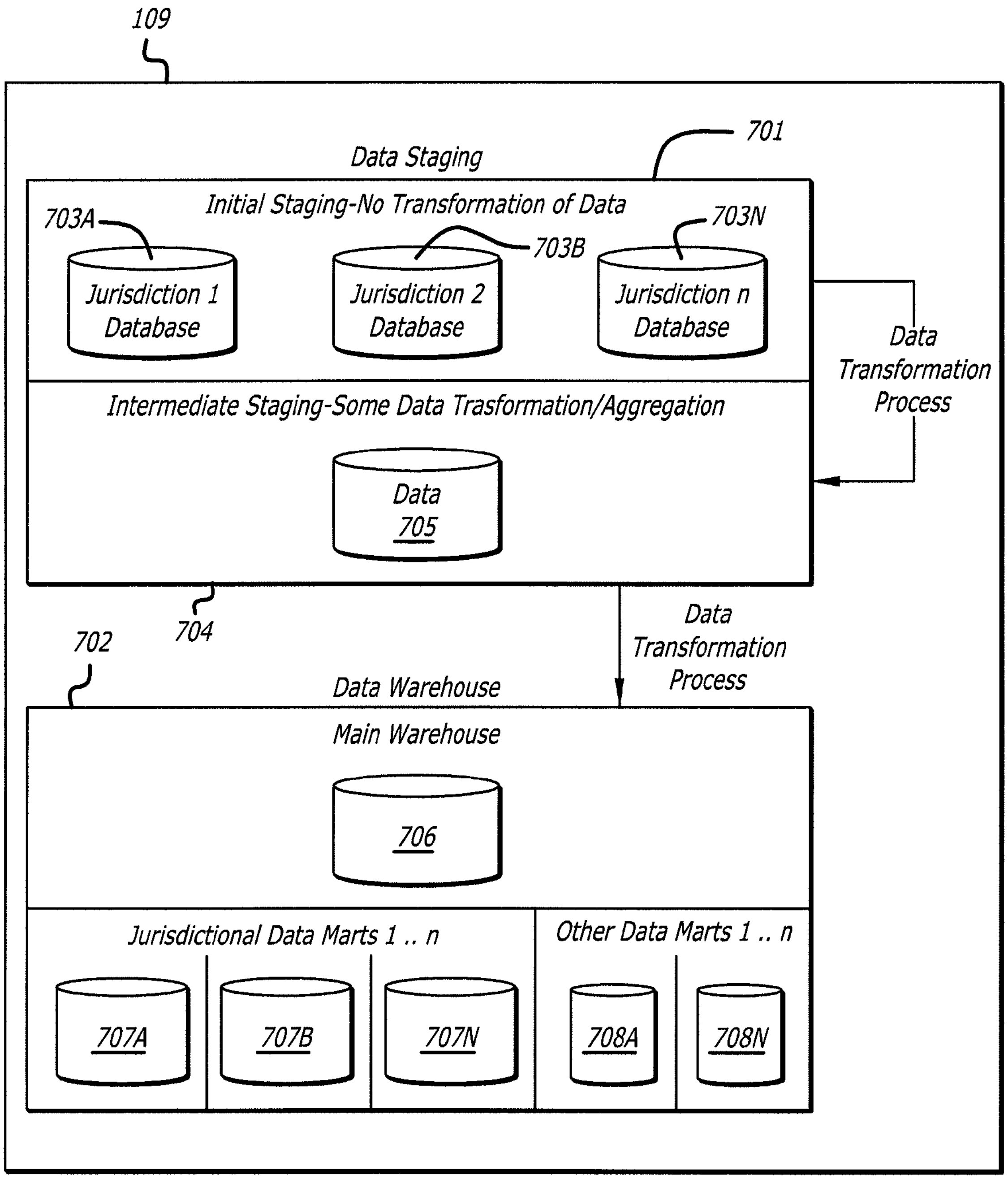
FIG. 7 is a block diagram of a database configuration in one embodiment of the system.

FIG. 7 illustrates a block diagram of one embodiment of a database archive for use in the system. The data archive is separate from all jurisdictional databases, and data flows in only one direction, from each jurisdictional database to a warm standby database server to the archive 109. The archive 109 consists of a data repository with an initial data staging area 701 and a data warehouse 702. The data staging area 701 contains a copy of each jurisdictional database 703A-703N (without transformation in one embodiment) and an intermediate staging area 704 for the data warehouse (with some data transformation in one embodiment) and storing data in database 705.

The data warehouse 702 follows accepted principles of warehouse design to provide the enterprise with timely information that can be displayed in such a way as to be useful in making both long term and short term decisions concerning cash flow, profitability of individual links, and games. The data warehouse 702 includes a main warehouse 706 for receiving the aggregated and transformed data from intermediate staging area 704 of data staging 701. The data warehouse 702 includes jurisdictional data marts 707A-707N along with other data marts 708A-708N. The data warehouse offloads reporting activities from the system, for example, gathering the betting characteristics of multiple machines over a desired time period (e.g. several year period) for a particular jurisdiction. Such a query involves fetching and summarizing hundreds of thousands of records. The data warehouse 702 contains transformed and aggregated presentation of the data for all jurisdictions in the enterprise.

The reporting interface 110 accesses all levels of the data archive 109. Data needed in near real time comes from the initial staging area 704. Highly aggregated and transformed data comes from the data warehouse 702. A variety of tools are used, from stored procedures and query building tools, to canned reports using third party tools (such as Crystal Reports). The foundation for these reports is built upon SQL queries.

Multilevel Progressive Meter

The system utilizes a messaging and management system that supports the control, update, and display of multiple levels of progressive prizes. The meters may be updated based on a number of events that take place on a gaming machine or machines. These are referred to herein as "meter related events." A meter may be updated based on any combination of one or more of the meter related events as desired. For example, there may be a plurality of meters, with each one associated with just one of the plurality of meter related events. In other instances, there may be groups of meters each associated with one of the meter related events. In other instances, each meter may be associated with one, some, or all, of the meter related events as desired.

By way of example, but not by way of limitation, meter related events may include coin in and other wagering data, coin out data, time played, insertion or withdrawal of a player-tracking card, time based event, number of players, or any other desired criteria.

Meter related event information is transmitted from each machine through its associated GMM 106 via CCM 104 to OCM 101. The OCM 101 includes the ability to update the meter value of one, some, or all of the progressive meters maintained by the OCM 101 based on the meter related event. Return messages to each GMM include values for each level of meter implemented for the game machine associated with the GMM. In some cases, a bank of game machines 108 may share a single progressive display. In that case, the display itself may have its own associated GMM with responsibility for updating the display. In other cases, one or more of the GMMs associated with the game machines in the bank of machines has responsibility for the display. When an update message is received, the GMM parses the message to obtain meter information and updates one or more displays appropriately, depending on the number of progressive prizes being implemented.

In addition to having the possibility of multiple progressive meters per game machine, the OCM may also track sets of one or more progressive meters for different populations of game machines that are networked to the OCM. Such populations or collections of game machines may be determined by game machine manufacturer, by casino, by state, or any other suitable manner of distinguishing collections of game machines.

Figure 6:
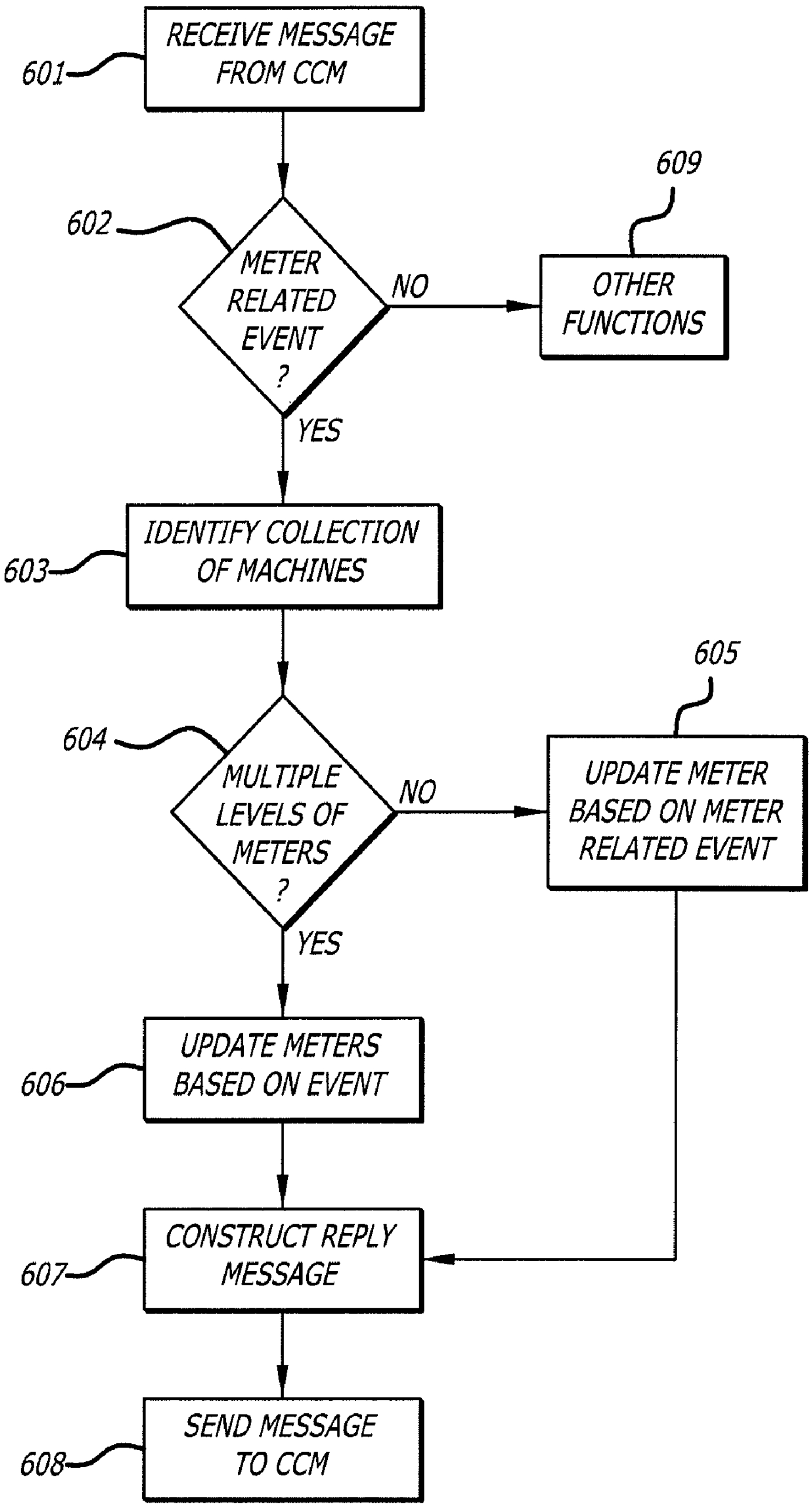
FIG. 6 is a flow diagram illustrating an embodiment of meter update.

FIG. 6 is a flow diagram of the operation of the OCM in receiving game machine information, updating progressive meters, and returning update messages. At step 601 the OCM receives a message from a CCM with game information. At step 602 the OCM determines if there is a meter related event to be processed. If not, the OCM performs other functions related to the message at step 609. If there is a meter related event, the OCM at step 603 identifies collections of machines, if any, associated with the CCM sending the message. At step 604, for each collection, the OCM determines if there are multiple meters to be updated. If not, the OCM updates the single meter based on the meter related event at step 605, constructs a reply message at step 607, and sends the reply to the CCM at step 608.

If there are multiple meters to update, the OCM updates each of the meters pursuant to a formula appropriate for the collection, the meter related event, and the game associated with the gaming machines at step 606. At step 607 a reply message is constructed with update information for each meter and at step 608 a reply message is sent to the CCM.

NAP/WAP Integration

The system permits the defining of multiple collections of gaming machines on the network. As a result, the system supports simultaneous implementation and management of NAP and WAP games on the same network. In addition, due to the multiple meter capability of the system, a single gaming machine may have one meter that is based on a WAP game and another meter that is based on a NAP game. Alternatively, game machines may be exclusively part of a NAP game or a WAP game as desired. Of course, either a NAP only game or a WAP only game can also support multiple progressive meters as desired.

Data Management

One problem with managing multi-jurisdiction networks is the need to satisfy all regulatory requirements for each jurisdiction while still having the necessary responsiveness to effectively manage the network. All data that comes to the OCM 101 is maintained on the associated database 102 and archived database 109. Periodically, the data on database 102 is transmitted to archive database 109 and collected into a report that can be burned onto some media format, such as a CD, tape, flash memory, DVD, etc., or the data report can be transmitted to any desired location using a network connection. In this manner, near real time reporting of data and performance is possible using the system, without jurisdictional restrictions that may be associated with the live database 102.

Game Performance Analysis System (GPAS)

The GPAS obtains coin-in information from the game machine using existing software and hardware capability of the game machine. The target game machines will connect to the live database 102 and archive database 109 using current the above described network capability.

GPAS uses communication protocols known as complex serial communication and extended simple serial (both are Bally proprietary protocol). The protocol is utilized to provide accounting information to the OCM of the SDS system. The protocol is event-driven; with the assumption the OCM shall maintain volatile meter and configuration data. The OCM is the trusted agent on the network. The relationship between the game machine and OCM is unidirectional; the game machine provides accounting information to the OCM when game play occurs. The accounting information reported by the game machine is not cumulative; it is relative to the single event. The OCM maintains the cumulative data. Exceptions are also reported to the OCM for security purposes. No configuration information is passed between the OCM and the game machine during initialization. The OCM is programmed independently before connecting to the game machine and the system. The GPAS feature is developed using the MAPS network as the collection mechanism of the accounting data. Target game machines for game performance analysis will connect to the MAPS network as a subscriber (exception if the game is not subscribing to a multi-area progressive link, the game is non-progressive). The GMM attached to the target game machines will present the MAPS link with valid configuration information for a progressive game, at the same time accept accounting information from the game machines as an OCM would.

As part of the MAPS network, GMM's operating with GPAS software will need to comply with configuration requirements of the network. During the initialization process, the MAPS database requires the cabinet ID of the game machine for verification purposes. Game machine denomination, game SMI number, and other configuration-related data are required after the cabinet ID is verified. The complex serial and extended simple serial communication protocols do not have the messaging capability to retrieve such data from the game machine. GPAS software will accommodate this by using default values as shown in the table below to satisfy the MAPS database requirement (with the exception of cabinet ID, which is dependent on the polling address selected).

| Configuration Data Element | Default Value |
|---|---|
| Complex Serial Default | |
| Cabinet ID | Gyyy71988xxx (ASCII) yyy = denom specific number, xxx = polling address. |
| SMI | yyy4332G (ASCII) yyy = denom specific number |
| Game number | 0x01 |
| Denomination | 5, 25, 50, or 100 (BCD) |
| Number of games | 0x01 |
| Game progressive flag | 0x01 |
| Game tier ID | 0x01 |
| Extended Simple Serial Default | |
| Cabinet ID | G0617ALxxyyy (ASCII) xx = game identification, yyy = polling address. |
| SMI | 43327Gxx (ASCII) xx = game identification |
| Game number | 0x01 |
| Denomination | No restriction |
| Number of games | 0x01 |
| Game progressive flag | 0x01 |
| Game tier ID | 0x01 |

Yield Management

In another embodiment, searches of the live database 102 and/or the archived database 109 are performed to produce other specifically desired reports, such as predictive analysis and yield management. In one embodiment, the yield management data includes projection data calculated based on one or more factors related to use of one or more gaming machines. For example, in one embodiment, the yield management data includes game play projection data, machine usage projection data, and/or income projection data calculated based historical game play data for the one or more gaming machines. In one embodiment, the calculations are performed using linear regression analysis. In another embodiment, the calculations are performed using a neural network. In one embodiment, yield management data is used to determine one or more bonuses.

One embodiment of the OCM 101 incorporates a yield management feature for the purpose of optimizing economic return using configuration control over the gaming machines. The yield management feature implements configuration control by setting optionable parameters including, by way of example only, and not by way of limitation: wager, theme, percentage and time in play. The analysis and predictive results are displayed using the graphical user reporting interface 110.

One embodiment of the system is able to analyze, automate, schedule, and control the options, operation, and configuration for thousands of machines. The system is capable of providing this control from a single property to many properties that may span states, countries, and even throughout the world.

In one embodiment, the system is capable of applying the yield management feature to an individual player. In another aspect of a embodiment, the system utilizes two forms of yield management in combination (i.e., physical groupings combined with individual player performance and monitoring).

In one embodiment, the yield management feature of the system is configured to optimize casino profitability. In one specific, non-limiting embodiment, casino profitability is represented by the formula:

$$CP = \sum_{time} (OP - OE)$$

Where:

CP=Casino Profit

OP=Operations Profit

OE=Operations Expenses

Additionally, in one embodiment of the system, time is a variable in yield management calculations. Further, it should be noted that operational expenses are included in the above casino profitability formula. In an embodiment, many aspects of operations performance are captured in the systems and messages. An additional aspect of the system involves applying yield management principles to operational efficiency issues, thereby further increasing casino profitability.

In a embodiment, each element of the operations profit formula (shown below) can be broken down and the principles of yield management applied. For the casino slot floor the operations profit, OP, can be broken into:

$$OP = \sum_{time} (POSP + SFD)$$

Where:

POSP=Point Of Sale Profit (includes hotel, retail, food and beverage and entertainment)

SFD=Slot Floor Drop

Continuing:

$$SFD = \sum_{time} (PL - \text{promotions})(RETURNVISIT)$$

Where:

RETURNVISIT=probability that the player will return to the casino.

PL=Player Loss

Promotions=marketing money the casino contributes to player kickbacks, comps, and system games.

Still continuing:

PL=ST*GCT*HPC*WAGER

Where:

ST=time the player spends at the slot machine, i.e., seat time

GCT=Game Cycle Time

HPC=Hold Percentage for the game

Further continuing:

WAGER=LINESBET*CREDITS*DENOM

Where:

LINESBET is the number of lines on which the player is betting.

CREDITS is the number of credits the player chooses to bet.

DENOM is denomination, i.e., the worth of an individual credit.

It should be noted that LINESBET, CREDITS, and DENOM can each be set to a minimum and are option-able parameters. As such, LINESBET, CREDITS, and DENOM are each under yield management control. Interestingly, changes in parameters within the PL (Player Loss) formula above can have a significant effect. Even if PL (Player Loss) is held constant, other element can still be modified within the formula. For example, GCT (Game Cycle Time) could be reduced by half while ST (Seat Time) is doubled. In this scenario, the player spends much more time at the game. Accordingly, such a player's chances of winning a progressive or system game are increased. Continuing this example, during slow times for the casino the above-described configuration change provides a method for the casino operator to enhance the attractiveness of the games to players without adversely compromising player loss or modifying progressive rules or systems games. The capability of the system provides a distinct advantage over prior gaming systems, in that no regulatory review of "new game rules" (i.e., new game configuration) is required.

An embodiment of the system includes the capability to link the above-described changes to marketing programs such as mailings, advertisements, phones calls, other marketing methods, and the like. In addition, system includes a linkage to system game operation and individual yield management, as described above.

In one embodiment of the system, the yield management feature of the system includes the ability to advertise, annunciate, and/or otherwise alert the player that yield management configuration change has occurred. Otherwise stated, in one specific, non-limiting embodiment, when the player sits at a gaming machine and is identified, the system annunciates to the player, "you are at 98% payback." In one embodiment, such an announcement is made and maintained for the player to observe through at least one game cycle.

In another aspect of an embodiment of the system, the yield management parameter modifications are applied interactively as the casino operates. For example, in one specific, non-limiting embodiment, every fifteen minutes, the "forward looking" algorithms for yield management operation note that a particular carousel is being heavily played. In such an embodiment, yield management parameters (e.g., minimum bet and the like) are then immediately modified on those gaming cabinets (in the carousel) that not currently in play. Thus, any new players joining the "hot" carousel are joining into game play that has had "tighter" yield management parameters applied. Accordingly, in such an example, those gaming patrons already on the "hot" carousel who have been a part of creating the "hot" feeling are at an advantage to those players joining later.

Likewise, in another specific, non-limiting embodiment, if the "forward-looking" algorithms for yield management operation detect that a carousel is "cooling," then yield management parameters (e.g., denomination and the like) can be immediately lowered or modified for ALL players. In this manner, those loyal players receive the same reward as new players joining the "action." Moreover, from a regulatory standpoint, relaxing yield management parameters on players during a gaming session is viewed far less restrictively than tightening yield management parameters on players during a gaming session. In this regard, in one embodiment, tightening yield management parameters on players requires at least an announcement (and possibly active acceptance of the modifications by the player), and more commonly inserting these configuration changes between player changes.

In an embodiment of the system, the yield management feature necessitates an audio and/or visual announcement to the players that yield management parameters have been changed. In this regard, parameter changes in the players' favor may be displayed on the game screen, presented in the systems interface (iView-type device), announced by sound and/or the like. As explained above, parameter changes that are not in the players' favor (i.e., changes that tighten yield management parameters on the players) typically require higher levels of announcement to the players and possibly active acceptance of the modifications by the players.

Referring again to the formulae above, slot floor drop the parameter RETURNVISIT (probability that the player will return to the casino) is a significant term. In a embodiment of the system, yield management accounts for the importance of maximizing the RETURNVISIT probability, while at the same time maximizing SFD (Slot Floor Drop, i.e., the money collected). In an embodiment of the system, a balance between these two elements is significant, and advantageously, is customizable by a casino administrator through the use of the yield management feature of the system.

In a embodiment of the system, the yield management feature enables cyclic patterns to be identified in order to both increase operator profitability and optimize player satisfaction, and thus return visits. Such factors, which are examined by the yield management feature in determining such cycles include, by way of example only, and not by way of limitation: demographics, weather, and entertainment events. In a embodiment of the system, use of the yield management feature enables casinos that have implemented the system to provide a much more personalized and individualized gaming experience.

In another aspect of a embodiment of the system, the yield management feature combines individual player performance over time with gross property wide yield management information. This combination gives each player its own unique play characteristics. In this regard, individualized characterization, control, and promotion are prominent features of such an embodiment. By combining yield management with player information, the system 10 enables customization of the game offerings specific to that customer.

Thus, in one specific, non-limiting embodiment, if a game cabinet holds fifteen game themes (i.e., game titles), only those game themes that the yield management predicts are most attractive to the player will be presented. Preferably, this extends to new game offerings as well, so that when new game themes are introduced, the yield management feature predicts if a particular player might like this new game theme, provides that game theme to the player, and announces to the player the existence of the new game theme. Additionally, as described above, parameters such as wager, game cycle time, and percentage can be set by the system, based upon player characteristics and overall yield management parameters.

In another specific, non-limiting embodiment of the system, if the "forward-looking" yield management algorithms predict over 80% occupancy then GCT (game cycle time) is reduced, thereby increasing profitability. Moreover, if indications are that occupancy will remain over 80%, then yield management can move to adjusting WAGER to higher minimums. In one embodiment, this adjustment might take the form of changing minimum lines, minimum credits, or denomination. As described above, the yield management feature of the system has a wide area of variables for affecting and adjusting slot floor profit.

Coordination of game performance data from multiple input sources into an analytic engine. Sources include but are not limited to: (1) slot data accounting, (2) multi-game game cabinet accounting, (3) player tracking data, comps, (4) hotel, (5) point of sale system data, (6) location, (7) game mix nearby, (8) entertainment data, (9) weather, (10) off site user group demographic data, and (11) grouping of players, including the monitoring of those groups and presentation of bonusing specific to that group.

In accordance with a embodiment of the system, the regulatory rules that allow control over gaming devices by electronic means are (1) GLI-21, and (2) NVGCB Proposed System Based and System Supported gaming regulations. Gaming devices with one or more modifiable parameters affecting yield management calculations include, by way of example only, and not by way of limitation: (1) theme, (2) wager (a) minimum bet, (b) maximum bet, (c) minimum lines bet, and (d) denomination, (3) percentage, and (4) play time, (a) spin cycle time, and (b) bonus round time.

In an embodiment of the system, the uses of the yield analysis feature, include by way of example only, and not by way of limitation: system-games, gaming user groups, casino gaming areas, casinos and multi-property gaming, base game play of relating system-games, and modification of system-game operation for optimization of overall property profitability. In another aspect of a embodiment of the system, the yield analysis feature includes predictive analysis engine for optimizing any desirable parameter (e.g., drop or occupancy during some future time). In one embodiment of the system 10, the yield analysis feature includes an automation system for aiding and advising slot floor managers in the optimal configuration of a casino floor, including individual parameterization of slot machines.

An embodiment the yield management aspect of the system is directed towards manipulation of gaming device parameters including, by way of example only, and not by way of limitation: wager, theme, percentage, and time in play to provide optimal casino profitability based upon predictive modeling. Additionally, in another aspect of a embodiment, predictive modeling includes parameters related to player, property occupancy, time of day, week, month, year, events, weather, demographics, and other similar parameters.

Another embodiment the yield management aspect of the system is directed towards linkage of yield management manipulation of gaming devices 108 with player-targeted marketing, including advertisements and inducements from casino to patrons. Still another embodiment the yield management aspect of the system is directed towards notifying a player for at least one game cycle that a yield management parameter has been modified on the gaming device being used by the player. Moreover, yet another embodiment the yield management aspect of the system is directed towards a system configured to combine message set capability with game design, wherein the game design enables capturing, analyzing, and reporting on individual machine, machine grouping, as well as individual player and player grouping performance over time.

Multi-Denomination Game Play

One feature of the system is to allow a player to select and/or change the denomination of a game they are playing which has as at least one of its awards a linked wide area jackpot, and to have the games represented by at least two of the denominations available for selection have the same linked wide area jackpot(s) as an available award. The games represented by the various denominations will be configured such that all shared wide area jackpot awards available for each denomination will have the same cost-to-jackpot. Thus, regardless of the specific denomination the player chooses, the expected amount of play required to achieve any available linked wide area jackpot in terms of absolute money will be the same for each denomination. Although the configuration of the game (e.g. number of lines, bet per line) may change between denominations, the cost-to-jackpot remains constant for all linked wide area jackpots. The advantage of this method is that players may freely choose to play their favorite denomination on a linked wide area game, and change that denomination at will without having to leave their current physical game and locate another with the specific denomination they wish to play.

It will be apparent from the foregoing that, while particular forms of the system have been illustrated and described, various modifications can be made without departing from the spirit and scope of the system. Accordingly, it is not intended that the system be limited, except as by the appended claims.

What is claimed is:

1. A game machine comprising:

memory for storing a plurality of dynamically changing progressive jackpots;

a module for switching from a wide area progressive environment to a near area progressive environment in response to an unintentional network failure or communications failure, wherein if communication is lost within the wide area progressive environment, the game machine automatically switches to near area progressive behavior until communication is restored, at which time the game machine switches back to the wide area progressive environment, wherein a local control module associated with the near area progressive environment collects betting information and game data when communication with the wide area progressive has failed, for eventual transmission to a central control module associated with the wide area progressive environment when communication with the wide area progressive environment is re-established; and processing means for determining when one of the plurality of progressive jackpots is awarded;

wherein the game machine enables play of multiple concurrently played dynamically changing progressive jackpots;

wherein the memory comprises a plurality of memory locations for tracking the plurality of dynamically changing progressive jackpots, wherein the memory locations are incremented based on a progressive prize meter on the game machine, and wherein each memory location is incremented at a different rate of increase.

2. The game machine of claim 1 wherein the progressive prize meter is a wager.

3. The game machine of claim 1 wherein the progressive prize meter is incremented in correlation with money paid out.

4. The game machine of claim 1 wherein each of the memory locations may be associated with one or more of the progressive prize meter.

5. A gaming network comprising:

a plurality of gaming machines coupled to the network, each gaming machine having a memory for storing a plurality of dynamically changing progressive jackpots, wherein the memory includes a plurality of memory locations for tracking the plurality of dynamically changing progressive jackpots;

a module on each game machine for switching from a wide area progressive environment to a near area progressive environment in response to an unintentional network failure or communications failure, wherein if communication is lost within the wide area progressive environment, the game machine automatically switches to near area progressive behavior until communication is restored, at which time the game machine switches back to the wide area progressive environment, wherein a local control module associated with the near area progressive environment collects betting information and game data when communication with the wide area progressive has failed, for eventual transmission to a central control module associated with the wide area progressive environment when communication with the wide area progressive environment is re-established;

an initiator on each game machine for initiating a game on the game machine; and processing means for determining when one of the plurality of progressive jackpots is awarded;

wherein the gaming machines enable play of multiple concurrently played dynamically changing progressive jackpots;

wherein the memory locations are incremented based on a progressive prize meter on any of the plurality of game machines, and wherein each memory location of a game machine is incremented at a different rate of increase.

6. The gaming network of claim 5 wherein the progressive prize meter is a wager.

7. The gaming network of claim 5 wherein the progressive prize meter is incremented in correlation with money paid out.

8. The gaming network of claim 5 further including a game machine module (GMM) coupled to each gaming machine.

9. The gaming network of claim 8 further including a casino control module ((CCM) coupled to a GMM.

10. The gaming network of claim 9 further including an operational control module (OCM) coupled to a CCM.

11. The gaming network of claim 10 further including a database coupled to the OCM.

12. The gaming network of claim 11 wherein wagers on the plurality of game machines are reported via the GMM and CCM to the OCM.

13. The gaming network of claim 12 wherein the value of each of the plurality of dynamically changing progressive jackpots is provided from the OCM to the game machines.

14. The gaming network of claim 13 wherein communication between the GMM and CCM is via Ethernet.

15. The gaming network of claim 14 wherein communication between the CCM and the OCM is via a message queuing system.

16. A method of controlling a game machine having a plurality of dynamically changing progressive jackpots comprising:

receiving a message containing meter related event data from a game machine;

converting currency and denominations used as a wager on the game machine into units;

updating the values of one or more of the plurality of dynamically changing progressive jackpots pursuant to the meter related event data, wherein the game machine includes a plurality of memory locations for tracking the plurality of dynamically changing progressive jackpots, wherein the memory locations are incremented based on a progressive prize meter on any of the plurality of game machines, and wherein each memory location of a game machine is incremented at a different rate of increase;

constructing a reply message to the game machine having updated values of each of the plurality of dynamically changing progressive jackpots; and enabling play of multiple concurrently played dynamically changing progressive jackpots on the game machine, wherein each game machine includes a module for switching from a wide area progressive environment to a near area progressive environment in response to an unintentional network failure or communications failure, wherein if communication is lost within the wide area progressive environment, the game machine automatically switches to near area progressive behavior until communication is restored, at which time the game machine switches back to the wide area progressive environment, wherein a local control module associated with the near area progressive environment collects betting information and game data when communication with the wide area progressive has failed, for eventual transmission to a central control module associated with the wide area progressive environment when communication with the wide area progressive environment is re-established.

17. The method of claim 16 wherein the game machine provides progressive prize meter data to a central controller via a network.

18. The method of claim 17 wherein the central controller maintains a database of progressive prize meter data and other game information from the game machine.

19. The method of claim 18 wherein the game machine communicates to the network via a game machine module (GMM).

20. The method of claim 16, further comprising switching from a wide area progressive environment to a near area progressive environment if communication with the wide area progressive environment is lost.

21. The game machine of claim 1, further comprising a plurality of meters, each meter being associated with each progressive jackpot.

22. The gaming network of claim 1, wherein one of the plurality of progressive jackpots is awarded for a non-maximum wager.

23. The gaming network of claim 5, wherein each gaming machine includes a plurality of meters, each meter being associated with each progressive jackpot.

24. The gaming network of claim 5, further comprising a module for converting currency and denominations used as a wager on the gaming machines into units, wherein the gaming network is independent of currency and denomination limitations.

25. The gaming network of claim 5, wherein one of the plurality of progressive jackpots is awarded for a non-maximum wager.

* * * * *

UNITED STATES PATENT AND TRADEMARK OFFICE

CERTIFICATE OF CORRECTION

PATENT NO. : 8,070,605 B2
APPLICATION NO. : 11/225703
DATED : December 6, 2011
INVENTOR(S) : Joseph T. L. Tien et al.

It is certified that error appears in the above-identified patent and that said Letters Patent is hereby corrected as shown below:

Column 1
In line 3, center and insert --COPYRIGHT NOTICE--

Column 13
In line 45, change "HP" to --IP--

Column 13
In line 66, change "form" to --from--

Column 18
In line 4, change "send it" to --sends them--

Column 18
In line 20, change "id" to --ID--

Column 18
In line 26, remove "since the data"

Column 18
In line 27, remove "base"

Column 18
In line 67, change "steps" to --step--

Column 19
In line 3, change "steps" to --step--

Column 19
In line 7, change "141413" to --1413--

Column 19
In line 8, change "steps" to --step--

Column 19
In line 11, change "steps" to --step--

Column 19
In line 14, change "steps" to --step--

Column 19
In line 20, change "steps" to --step--

Column 22
In line 20-21 change "send" to --sending--

Column 32
In line 27, remove "DWL" and insert --DIL--

Column 38
In line 41, after "that" insert --are--

Signed and Sealed this
Seventh Day of February, 2012

David J. Kappos
*Director of the United States Patent and Trademark Office*